(12) United States Patent
Li et al.

(10) Patent No.: US 8,989,086 B2
(45) Date of Patent: Mar. 24, 2015

(54) METHODS AND APPARATUS TO SUPPORT INTERFERENCE MANAGEMENT IN MULTI-TIER WIRELESS COMMUNICATION SYSTEMS

(75) Inventors: Ying Li, Garland, TX (US); Ji-Yun Seol, Seonam-si (KR); Young Bo Cho, Seonam-si (KR); Zhouyue Pi, Allen, TX (US); Sudhir Ramakrishna, Plano, TX (US); Kaushik Josiam, Dallas, TX (US); Jaehyuk Jang, Suwon-si (KR)

(73) Assignee: Samsung Electronics Co., Ltd.

( * ) Notice: Subject to any disclaimer, the term of this patent is extended or adjusted under 35 U.S.C. 154(b) by 803 days.

(21) Appl. No.: 12/944,347

(22) Filed: Nov. 11, 2010

(65) Prior Publication Data

US 2011/0116480 A1    May 19, 2011

Related U.S. Application Data

(60) Provisional application No. 61/261,226, filed on Nov. 13, 2009, provisional application No. 61/378,354, filed on Aug. 30, 2010, provisional application No. 61/288,615, filed on Dec. 21, 2009, provisional application No. 61/329,519, filed on Apr. 29, 2010.

(51) Int. Cl.
*H04W 4/00* (2009.01)
*H04W 28/04* (2009.01)
*H04W 4/06* (2009.01)
(Continued)

(52) U.S. Cl.
CPC .............. *H04W 28/04* (2013.01); *H04W 4/06* (2013.01); *H04W 64/00* (2013.01); *H04W 84/045* (2013.01); *Y02B 60/50* (2013.01)
USPC ........................................................ 370/328

(58) Field of Classification Search
USPC .................................................. 370/328, 329
See application file for complete search history.

(56) References Cited

U.S. PATENT DOCUMENTS

| 7,505,779 | B1  |    | 3/2009  | David |
|-----------|-----|----|---------|-------|
| 7,630,712 | B2  | *  | 12/2009 | Altshuller et al. ......... 455/432.1 |
| 8,260,206 | B2  |    | 9/2012  | Damnjanovic |

(Continued)

FOREIGN PATENT DOCUMENTS

| CN | 101527970 A  | 9/2009 |
|----|--------------|--------|
| JP | 2008 172376  | 7/2008 |

(Continued)

OTHER PUBLICATIONS

NTT ; ("CSG with limited open access") ; 3GPP; pp. 1-2.*

(Continued)

*Primary Examiner* — Ricky Ngo
*Assistant Examiner* — Dewanda Samuel

(57) ABSTRACT

When a subscriber station (SS) encounters interference caused an interfering base station (BS), the interference can be mitigated regardless of whether the interfering base station is a CSG-Closed BS or whether the SS is connected to a serving BS. If the SS is not connected to a serving BS and cannot access the interfering BS, the SS will signal the interfering BS directly to request the interfering BS to perform IM. If the SS is a legal user, and conditions to initiate IM are met, the interfering BS will perform IM until conditions to terminate IM are met. If the SS is connected to a serving BS, the serving BS will request the interfering BS to perform or terminate interference mitigation (IM) on behalf of the SS if certain conditions are satisfied.

34 Claims, 14 Drawing Sheets

(51) Int. Cl.
*H04W 64/00* (2009.01)
*H04W 84/04* (2009.01)

(56) References Cited

U.S. PATENT DOCUMENTS

| | | | |
|---|---|---|---|
| 8,265,562 B2* | 9/2012 | Gorokhov et al. | 455/63.1 |
| 8,289,889 B2* | 10/2012 | Lee et al. | 370/278 |
| 8,400,985 B2* | 3/2013 | Ahmadi et al. | 370/332 |
| 8,447,313 B2* | 5/2013 | Jung et al. | 455/435.1 |
| 8,504,091 B2 | 8/2013 | Palanki et al. | |
| 2003/0017838 A1* | 1/2003 | Kayama et al. | 455/525 |
| 2005/0192011 A1* | 9/2005 | Hong et al. | 455/440 |
| 2008/0267153 A1* | 10/2008 | Mukherjee et al. | 370/338 |
| 2009/0080386 A1* | 3/2009 | Yavuz et al. | 370/337 |
| 2009/0092111 A1* | 4/2009 | Horn et al. | 370/338 |
| 2009/0104905 A1* | 4/2009 | DiGirolamo et al. | 455/434 |
| 2009/0156208 A1* | 6/2009 | Vesterinen et al. | 455/435.1 |
| 2009/0187690 A1* | 7/2009 | Smart et al. | 710/105 |
| 2009/0238117 A1* | 9/2009 | Somasundaram et al. | 370/328 |
| 2009/0264077 A1* | 10/2009 | Damnjanovic | 455/63.1 |
| 2009/0264142 A1 | 10/2009 | Sankar et al. | |
| 2010/0015921 A1* | 1/2010 | Yavuz et al. | 455/63.1 |
| 2010/0035615 A1* | 2/2010 | Kitazoe et al. | 455/436 |
| 2010/0098025 A1* | 4/2010 | Chen et al. | 370/331 |
| 2010/0099450 A1* | 4/2010 | Lu et al. | 455/501 |
| 2011/0159898 A1* | 6/2011 | Venkatachalam | 455/501 |

FOREIGN PATENT DOCUMENTS

| | | | |
|---|---|---|---|
| JP | 2011-514040 A | | 4/2011 |
| JP | 2011-518519 A | | 6/2011 |
| KR | 10-2009-0029357 | | 3/2009 |
| WO | WO 2009/099813 A1 | | 8/2009 |
| WO | WO 2009/129413 A2 | | 10/2009 |

OTHER PUBLICATIONS

3GPP; ( "3G Home NodeB Study Item Technical Report") 3GPP; V8.1.1; pp. 1-40.*

Jungje et al.; ("Message format of AMS measurement configuration and report for self-organizing network") ; Aug. 2009;IEEE 802.16 Broadband Wireless Access Working Group; pp. 1-18.*

International Search Report dated Jul. 28, 2011 in connection with International Patent Application No. PCT/KR2010/008008.

Translated First Chinese Office Action dated Jun. 3, 2014 in connection with Chinese Patent Application No. 2010800614499.

3GPP TSG RAN WG4 #51bis; "LTE HeNB Interference studies; Hybrid cell deployment scenarios" R4-092504; Jun. 29-Jul. 2, 2009; Los Angeles, USA; 7 pages.

3GPP TSG-RAN WG3 Meeting #65; "Access mode change of CSG cell during Operation"; R3-091800; Shenzhen, P.R. China; Aug. 24-28, 2009; 2 pages.

* cited by examiner

US 8,989,086 B2

METHODS AND APPARATUS TO SUPPORT INTERFERENCE MANAGEMENT IN MULTI-TIER WIRELESS COMMUNICATION SYSTEMS

CROSS-REFERENCE TO RELATED APPLICATION(S) AND CLAIM OF PRIORITY

The present application is related to U.S. Provisional Patent Application No. 61/261,226, filed Nov. 13, 2009, entitled "METHODS AND APPARATUS TO SUPPORT INTERFERENCE MITIGATION IN COMMUNICATION SYSTEMS WITH BASE STATIONS OPERATING AT THE SAME FREQUENCY CARRIER" and U.S. Provisional Patent Application No. 61/378,354, filed Aug. 30, 2010, entitled "METHODS AND APPARATUS TO SUPPORT INTERFERENCE MITIGATION IN MULTI-TIER WIRELESS COMMUNICATION SYSTEMS." Provisional Patent Application Nos. 61/261,226 and 61/378,354 are assigned to the assignee of the present application and is hereby incorporated by reference into the present application as if fully set forth herein. The present application hereby claims priority under 35 U.S.C. §119(e) to U.S. Provisional Patent Application Nos. 61/261,226 and 61/378,354.

The present application is also related to U.S. Provisional Application No. 61/288,615, filed Dec. 21, 2009, entitled "METHODS AND APPARATUS TO SUPPORT INTERFERENCE MITIGATION IN MULTI-TIER WIRELESS COMMUNICATION SYSTEMS." U.S. Provisional Application No. 61/288,615 is assigned to the assignee of the present application and is hereby incorporated by reference into the present application as if fully set forth herein. The present application hereby claims priority under 35 U.S.C. §120 to U.S. Provisional Application No. 61/288,615.

The present application is also related to U.S. Provisional Application No. 61/329,519, filed Apr. 29, 2010, entitled "METHODS AND APPARATUS TO SUPPORT INTERFERENCE COORDINATION IN HETEROGENEOUS NETWORKS." U.S. Provisional Application No. 61/329,519 is assigned to the assignee of the present application and is hereby incorporated by reference into the present application as if fully set forth herein. The present application hereby claims priority under 35 U.S.C. §120 to U.S. Provisional Application No. 61/329,519.

TECHNICAL FIELD OF THE INVENTION

The present application relates generally to interference management in communication systems and, more specifically, to a method and an apparatus to support interference management in communication systems with macrocells overlaying small cells such as femtocells.

BACKGROUND OF THE INVENTION

Interference management is a key problem in multi-tier wireless communication systems. Due to limited spectrum available for cellular system, multi-tier cells may use the same frequency carrier which may cause co-channel interference. In addition, a multi-tier system may include heterogeneous cells. For example, some of the cells (e.g., femtocell base station) can be of a type of Closed Subscriber Group (CSG) which only allows subscribers to access the cell. When a femtocell base station (FBS), such as a CSG FBS, operates at the same frequency allocation (FA) or carrier frequency as the overlay macrocell base station, a subscriber station (SS) that is serviced by the BS (but is not a member of the overlaid CSG femtocell) may encounter interference caused by the CSG FBS as it gets close to the CSG FBS, such that its connection with the MBS may be weakened or disconnected.

Furthermore, if the CSG PBS is closed to non-members (i.e. it s a CSG-Closed FBS), the SS cannot handover to the CSG FBS. That is, the SS encounters interference from the CSG FBS such that it may be in a coverage hole. In this situation, interference mitigation (IM) is needed for both downlink (DL) and uplink (UL) control and data channels to provide the SS with a satisfied Quality of Service (QoS) while the CSG FBS can still have good coverage.

Therefore, there is a need in the art to better support IM in a wireless communication system. In particular, there is a need for a method and apparatus that use robust triggers to initiate and terminate IM that can be used by all types of base stations.

SUMMARY OF THE INVENTION

A Closed Subscriber Group (CSG) base station (BS) capable of performing interference mitigation (IM) in a wireless communication network is provided. The CSG BS includes an a wireless communication unit for communicating with subscriber stations (SSs). A controller is coupled to the wireless communication unit. The controller directly receives a ranging purpose indication in a ranging request message from a non-member SS through the wireless communication unit. The controller also selectively performs an IM from among predetermined IM methods, including reducing Tx Power locally and changing from a CSG-Closed status to a CSG-Open status, if the CSG BS is in the CSG-Closed status.

A method in a Closed Subscriber Group (CSG) base station (BS) for supporting interference mitigation (IM) when encountering interference in a wireless communication network is provided. The method includes directly receiving a ranging purpose indication in a ranging request message from a non-member SS through a wireless communication unit. An IM from among predetermined IM methods is selectively performed. The predetermined IM types include at least one of reducing Tx Power locally and changing from the CSG-Closed status to a CSG-Open status, if the CSG BS is in the CSG-Closed status.

A Closed Subscriber Group (CSG) base station (BS) capable of performing interference mitigation (IM) in a wireless communication network is provided. The CSG BS includes a wireless communication unit for communicating with subscriber stations (SSs). A controller is coupled to the wireless communication unit. The controller directly receives a ranging purpose indication in a ranging request message from a non-member SS through the wireless communication unit. The controller changes the CSG BS from a CSG-Closed status to a CSG-Open status, if the CSG BS is in the CSG-Closed status. The ranging purpose indication indicates that the SS is experiencing a femto interference. The CSG-Closed status of the CSG BS does not allow non-member SSs to access the CSG BS.

A method in a Closed Subscriber Group (CSG) base station (BS) for supporting'interference mitigation (IM) when encountering interference in a wireless communication network is provided. The method includes directly receiving a ranging purpose indication in a ranging request message from a non-member SS through a wireless communication unit. The CSG BS is changed from a CSG-Closed status to a CSG-Open status, if the CSG BS is in the CSG-Closed status. The ranging purpose indication indicates that the SS is experiencing a femto interference. The CSG-Closed status of the CSG BS does not allow non-member SSs to access the CSG BS.

A Closed Subscriber Group (CSG) base station (BS) capable of performing interference mitigation (IM) is provided. The CSG BS includes a wireless communication unit for communicating with subscriber stations (SSs). A controller is coupled to the wireless communication unit. The controller receives a ranging request message from a non-member SS through the wireless communication unit. The ranging request message includes a ranging purpose indication. The controller also performs an IM if conditions to initiate IM are met.

A method in a Closed Subscriber Group (CSG) base station (BS) for supporting interference mitigation (IM) when encountering interference in a wireless communication network is provided. The method includes receiving a ranging request message from a non-member SS through a wireless communication unit. The ranging request message includes a ranging purpose indication. An IM is performed if conditions to initiate IM are met.

A serving base station (BS) is capable of supporting interference mitigation (IM) when a subscriber station (SS) encounters interference. The serving BS includes a wireless communication unit configured to communicate with SSs and a controller coupled to the wireless communication unit. The controller request an interfering BS to perform IM when, based on a scanning report for IM initiation, the SS is unable to handover to any neighboring BS and conditions for IM initiation are met. In addition, the controller requests the interfering BS to terminate IM when, based on a scanning report for IM termination, conditions for IM termination are met.

A method for supporting interference mitigation (IM) when a subscriber station (SS) being served by the BS encounters interference is provided. The method includes requesting an interfering BS to perform IM when, based on a scanning report for IM initiation, the SS is unable to handover to any neighboring BS and conditions for IM initiation are met. The interfering BS is requested to terminate IM when, based on a scanning report for IM termination, conditions for IM termination are met.

A subscriber station for supporting interference mitigation (IM) when encountering interference is provided. The subscriber station includes a receiver for receiving messages from base stations. A transmitter transmits messages to base stations. A controller is coupled to the receiver and the transmitter. If the subscriber station is connected to a serving BS, a first scanning report is sent to the serving BS to initiate IM with an interfering BS when handover to another BS is not possible and trigger conditions to send scanning report for IM initiation are met. If the subscriber station is not connected to any BS, a ranging request comprising a ranging purpose indication is sent to the interfering BS to initiate the IM when handover to the interfering BS is not possible and trigger conditions to signal the interfering BS for IM initiation are met.

A method in a subscriber station for supporting interference mitigation (IM) when encountering interference in a wireless communication network is provided. If the subscriber station is connected to a serving BS, a first scanning report is sent to the serving BS to initiate IM with an interfering BS when handover to another BS is not possible and trigger conditions to send scanning report for IM initiation are met. If the subscriber station is not connected to any BS, a ranging request comprising a ranging purpose indication is sent to the interfering BS to initiate the IM when handover to the interfering BS is not possible and trigger conditions to signal the interfering BS for IM initiation are met.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
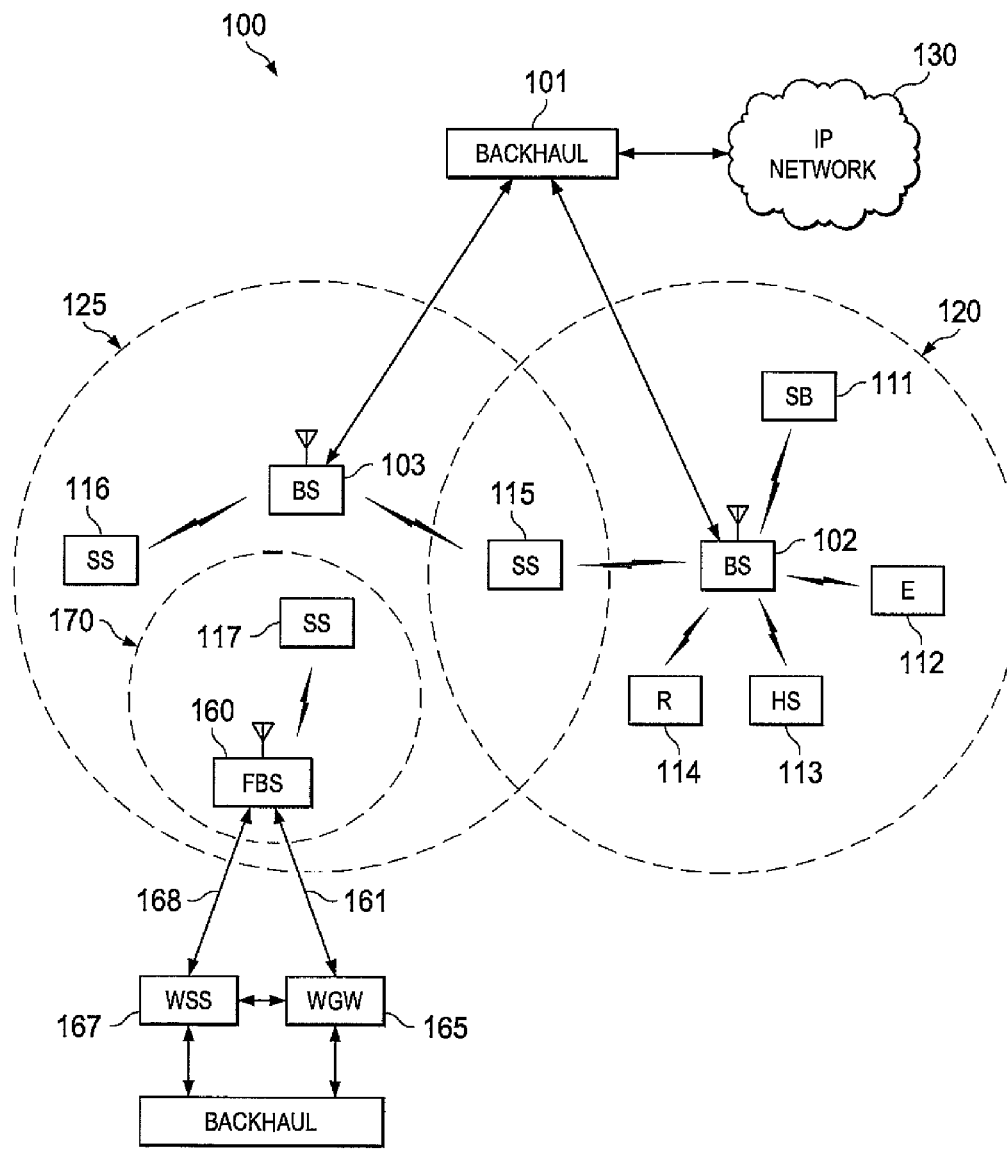
FIG. 1 illustrates a wireless network according to the principles of the disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Embodiments in the present disclosure support interference management in multi-tier wireless communication systems. Some types of Interference Mitigation are disclosed in IEEE P802.16m/D3, "Draft amendment for IEEE 802.16m," December, 2009; IEEE C802.16m-09/2405r1, "Interference Mitigation in Femto ABS (15.4.11)," November, 2009; IEEE P802.16m/D1, "Draft amendment for IEEE 802.16m," July. 2009; IEEE P802.16m/D2, "Draft amendment for IEEE 802.16m," October 2009; IEEE 802.16m-07/002r8, "IEEE 802.16m System Requirements Document (SRD)," January, 2009; IEEE 802.16m-08/003r9a, "IEEE 802.16m System Description Document (SDD)," June 2009; IEEE 802.16, "P802.16m.D5," April, 2010, the contents of which are incorporated by reference. Accordingly, the present disclosure may use some terms that may be aligned with IEEE 802.16m system. However, the ideas and solutions in the disclosure are not limited to the IEEE 802.16m system as they can be used in any communication system and network, with the terms probably being called in different names.

Embodiments of the present invention described below relate to techniques for Interference Mitigation (IM) in a communication system may include a femtocell base station. It should be understood that the following description might refer to terms utilized in various standards merely for simplicity of explanation. For example, the following description may refer to terms utilized in the Institute of Electrical and Electronics Engineers (IEEE) 802.16m standard or the 3rd Generation Partnership Project (3GPP) Long Term Evolution (LTE) standard. However, this description should not be interpreted as being limited to the IEEE 802.16m or 3GPP LTE standards. Independent of the mechanism used for handoff, it is preferable to perform IM and it is advantageous for that ability to conform to a standardized mechanism.

It will be understood that although examples herein may refer to a specific communication standard, such as by terms aligned with an IEEE 802.16m system, embodiments of the present disclosure are not limited in IEEE 802.16m system, and can be used in any communication system and network, with the terms referred to by different names. The following are some examples. Mobile station (MS) or Advanced mobile station (AMS) are meant to refer the subscriber station. For the purposes of the present disclosure, Base station (BS) or Advanced base station (ABS) are meant to generally refer any type of base station, including a macrocell, microcell, picocell, femtocell, and so forth. Cell ID or Preamble refers the physical level identifier of the base station, usually conveyed in synchronization channel. The cell ID could be reused within a type of base station. Frequency allocation (FA), or carrier frequency, refers the frequency carrier (spectrum) used by a base station. Handover (HO) refers that an MS is handed over to a serving BS to a targeting BS. Handover command (HO-CMD) refers a message used to notify MS how/when to handover. Base station identifier (BSID) refers a globally unique identifier of the base station. Super frame header (SFH) is part of the broadcast channel (BCH). SFH contains most important system information. Advanced air interface (AAI) may be used as the prefix of some control messages, and they are interchangeable to those messages without such prefix.

The femtocell concept is proposed to provide ubiquitous connectivity to SSs and improve wireless capacity, while addressing a service limitation of a shadow region, a region in which channel deterioration is caused by a physical obstruction. A femtocell is a small cell coverage area that is serviced by a femtocell BS (FBS) that accesses a wireless communication Core Network (CN) via a commercial broadband network or via a wireless connection to a backhaul of the wireless communication system. Hereafter, the term "femtocell" may be used interchangeably with the term "FBS." The deployment of the femtocell improves both the coverage and capacity of the wireless communication system. Going forward, the advantages of the femtocell are expected to be increasingly leveraged in wireless communication systems. Because the femtocell coverage area is much smaller than a macrocell coverage area, a plurality of femtocells may coexist within the coverage area of an overlay macrocell base station (MBS). Hereinafter the term "MBS" may be used interchangeably with the term "base station" or "BS". The FBS is capable of providing service to a relatively small number of SSs, unlike the BS, which is capable of providing service to a large number of SSs. The FBS typically operates in a licensed spectrum and may use the same or different frequency as the BS. Further, SSs serviced by an FBS may be stationary or moving at low (i.e., pedestrian) speed. Similar to the need for handoff between BSs, handoff between the FBS and the BS, and handoff between femtocells, is a key function in securing service continuity of an SS.

The FBS may be installed inside or adjacent to an indoor space to which it is intended to provide service, such as a home or Small Office/Home Office (SOHO). Installation of the FBS is significantly easier than installation of the BS and the FBS may be purchased and installed by a subscriber for use in conjunction with the wireless communication system. Here, the subscriber or service provider may desire to limit access to the FBS and only provide access to authorized SSs. To facilitate this arrangement, a Closed Subscriber Group (CSG) FBS may be employed. The CSG FBS can be further categorized as a CSG-Closed and a CSG-Open FBS. A CSG-Closed FBS may only provide access to authorized SSs, except for emergency services and National Security/Emergency Preparedness (NS/EP) services. A CSG-Open FBS is primarily accessible to the SSs that belong to its CSG. In addition, a CSG-Open FBS may allow non-subscribers of the CSG a low priority access, or a best-effort access, as long as the Quality of Service (QoS) of SSs in its CSG is not compromised. Alternatively, an Open Subscriber Group (OSG) FBS may be employed that provides access to any SS.

The FBS has different operational requirements than the BS, the specifics of which may differ depending on the wireless communication system in which the FBS is implemented. For example, in a wireless communication system operating according to the Institute of Electrical and Electronics Engineers (IEEE) 802.16m standard, it is required that the air interface support features needed to limit SSs scanning for FBSs. Furthermore, it is required that the air interface support SSs in being able to access and handover (HO) to CSG FBSs if they are designated as part of the CSG. In addition, it is required that the air interface supports preferred access and HO of mobile stations to their designated FBSs. Also, it is required that the air interface supports optimized and seamless session continuity and HO between FBSs and Wireless Fidelity (WiFi) access systems. Moreover, it is required that the air interface allows for a dense deployment of a large number of femtocells in a wireless communication system.

That being said, it is noted that interference mitigation (IM) in the present disclosure is not limited to inaccessible base stations. IM may be initiated with any base station that is causing interference. Although the figures or embodiments may refer to inaccessible base stations or CSG-Closed femtocell base stations, the present disclosure can be extended to any base station, accessible or inaccessible. For example, IM may be performed by an accessible BS that is interfering with communication between a subscriber station and a serving BS of the subscriber station.

In addition, the terms "interference mitigation" and "IM" as used in the present disclosure refers to any type of interference management, including interference avoidance, interference cancellation, and interference coordination, among others.

The "trigger condition(s)" in this disclosure are interchangeable to "condition(s)".

FIG. 1 illustrates a wireless network 100 according to the principles of the disclosure. In the illustrated embodiment, wireless network 100 includes backhaul 101, base station (BS) 102, base station (BS) 103, and other similar base stations (not shown). backhaul 101 is in communication with BS 102, BS 103, Wireless Gateway (WGW) 165, and Wireless Soft Switch (WSS) 167. Backhaul 101 is also in communication with Internet 130 or a similar IP-based network (not shown).

BS 102 provides wireless broadband access (via backhaul 101) to Internet 130 to a first plurality of subscriber stations within coverage area 120 of BS 102. The first plurality of subscriber stations includes subscriber station (SS) 111, which may be located in a small business (SB), SS 112, which may be located in an enterprise (E), SS 113, which may be located in a wireless fidelity (WiFi) hotspot (HS), SS 114, which may be located in a first residence (R), and SS 115, which may be located in a second residence (R).

BS 103 provides wireless broadband access (via backhaul 101) to Internet 130 to a second plurality of subscriber stations within coverage area 125 of BS 103. The second plurality of subscriber stations includes SS 115 and subscriber station 116, which may be a mobile station (MS), such as a cell phone, a wireless laptop, a wireless PDA, or the like. In an exemplary embodiment, BSs 101-103 may communicate with each other and with SSs 111-116 using OFDM or OFDMA techniques.

In one embodiment of the present disclosure, each of BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 120, 125, 170, and the base station controller associated with each base transceiver subsystem are collectively represented by BS 102, BS 103, and FBS 160, respectively.

The wireless network 100 also includes a femtocell base station (FBS) 160. FBS 160 is located within the coverage area of 125 of BS 103 and includes components analogous to those found in BS 102, and BS 103. As such, FBS 160 comprises a femto base station controller (FBSC) and one or more femto base transceiver subsystem(s) (FBTS). FBS 160, a CSG-Closed FBS, normally communicates with subscriber stations that belong to its CSG (such as SS 117) in its served area. FBS 160 may be an open subscriber group (OSG) FBS, a closed subscriber group (CSG)-Closed FBS, or a CSG-Open FBS.

Backhaul 101 may be in communication with either a greater number or a lesser number of base stations. Furthermore, while only seven subscriber stations are depicted in FIG. 1, it is understood that wireless network 100 may provide wireless broadband access to additional subscriber stations. It is noted that SS 115 is located on the edges of both coverage area 120 and coverage area 125. SS 115 communicates with both base station 102 and base station 103 and may be said to be operating in handoff mode, as known to those of skill in the art.

SSs 111-117 may access voice, data, video, video conferencing, and/or other broadband services via Internet 130. In an embodiment, one or more of SSs 111-117 may be associated with an access point (AP) of a WiFi WLAN. SS 116 and SS 117 may be any of a number of mobile devices, including a wireless-enabled laptop computer, personal data assistant, notebook, handheld device, or other wireless-enabled device. SSs 114 and 115 may be, for example, a wireless-enabled personal computer (PC), a laptop computer, a gateway, or another device.

Voice bearer traffic is transferred between the FBS 160 and the IS-41 network (e.g., PSTN) via communication line 161, Wireless Gateway (WGW) 165. Signaling/control traffic are transferred between the FBS 160 and the IS-41 network via communication line 168 and Wireless Soft Switch (WSS) 167. The WGW 165 and WSS 167 are coupled via a backhaul connection (not shown), e.g., the IS-41, to a mobile switching center (MSC). The WGW 165 provides a bearer path between FBS 160 and MSC 140 via the IS-41. The WSS 167 provides a signaling path FBS 160 and WGW 165 as well as to the MSC 140 via the IS-41. Though, not shown in FIG. 1, FBS 160 and BS 103 may communicate with each other via the backhaul.

Throughout the present disclosure, and unless expressly noted otherwise, FBS 160 will be considered a CSG-Closed FBS that operates at the same frequency allocation (FA) or carrier frequency as BS 103, the overlay macrocell base station, but the embodiments in this disclosure are not limited to the same FA cases, and the embodiments are applicable to the cases where FBS and macro BS are at different FAs. Hereinafter, BS 103 may also be referenced as "overlay BS 103" or "Serving BS 103." SS 116 is not authorized to access FBS 160, while SS 117 is authorized to access FBS 160. Hereinafter, SS 116 may be referenced as "non-member SS 116," and SS 117 may be referenced as "member SS 117." As shown, member SS 117 is receiving service from FBS 160 as non-member SS 116 enters coverage area 170 of FBS 160. As SS 116 enters coverage area 170, SS 116 receives a strong signal from FBS 160. The signal of FBS 160 ends up causing strong interference to SS 116, thereby preventing SS 116 from receiving service from BS 103. Unless FBS 160 grants access, SS 116, which does not belong to the CSG of FBS 160, is unable to handover from Serving BS 103 to FBS 160 and take advantage of the strong signal of the FBS 160 for service.

According to embodiments of the present disclosure, when a non-member SS cannot handover to a CSG-Closed femtocell base station and certain trigger conditions are met, either the Serving BS 103 or the SS 116 initiates interference mitigation (IM) or termination of IM with the interfering FBS 160 via the backhaul or network. IM affects the DL/UL control channel and data channel when a CSG-Closed femtocell base station operates at the same FA or carrier frequency as the overlay BS and other nearby BSs. As will be discussed further, trigger conditions can be based on at least one of the Received Signal Strength Indication (RSSI) of the Serving BS 103 and/or the FBS 160, a determination of available macrocell base stations and femtocell base stations, a threshold RSSI, and time duration of interference.

Embodiments of the present disclosure also disclose how an SS may effectively detect its subscribed femtocell base station while minimizing power consumption by avoiding unnecessary scanning. The SSs, according to embodiments of the present disclosure, may also wake up FBSs that are in low duty mode or idle state.

It is noted that the dotted lines in FIG. 1 shows the approximate boundary of coverage area 170 in which FBS 160 is located. The coverage area is shown approximately circular for the purposes of illustration and explanation only. It should be clearly understood that each of the cells 120, 125, and 170 may have an irregular shape, depending on the cell configuration selected and natural and man-made obstructions. Furthermore, it should be understood that the boundary of cell 170 may extend past the boundary of cell 125.

Figure 2:
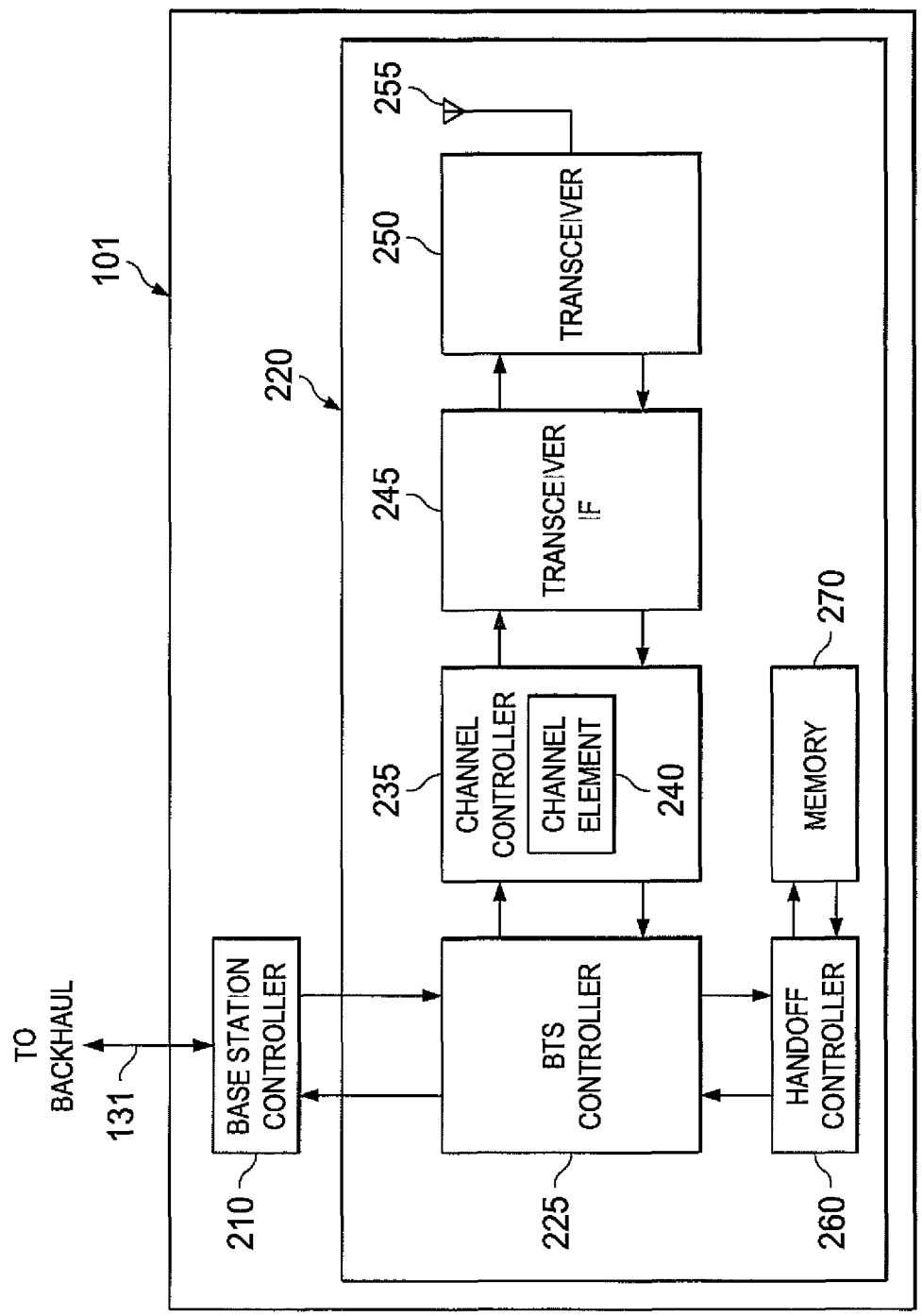
FIG. 2 illustrates macrocell base station 103 according to an embodiment of the present disclosure.

FIG. 2 illustrates macrocell base station 103 according to an embodiment of the present disclosure. The embodiment of BS 103 illustrated in FIG. 2 is for illustration only. Other embodiments of BS 103 could be used without departing from the scope of this disclosure. It will be understood that although BS 103 is described for illustration and example only, descriptions can apply to BS 102 equally.

BS 103 includes base station controller (BSC) 210 and base transceiver subsystem (BTS) 220. Base station controllers and base transceiver subsystems were described previously in connection with FIG. 1. BSC 210 manages the resources in cell site 125, including BTS 220. BTS 220 comprises BTS controller 225, channel controller 235, transceiver interface (IF) 245, RF transceiver unit 250, and antenna array 255. Channel controller 235 comprises a plurality of channel elements, including exemplary channel element 240. BTS 220 also comprises a handoff controller 260. The embodiment of handoff controller 260 and memory 270 included within BTS 220 is for illustration only. Handoff controller 260 and memory 270 can be located in other portions of BS 103 without departing from the scope of this disclosure.

BTS controller 225 includes processing circuitry and memory capable of executing an operating program that communicates with BSC 210 and controls the overall operation of BTS 220. Under normal conditions, BTS controller 225 directs the operation of channel controller 235, which contains a number of channel elements, including channel element 240, that perform bi-directional communications in the forward channels and the reverse channels. A forward channel refers to a channel in which signals are transmitted from the base station to the mobile station. A reverse channel refers to a channel in which signals are transmitted from the mobile station to the base station. In some embodiments, the channel elements communicate according to a code division multiple access (CDMA) protocol with the mobile stations in cell 125. In additional and alternative embodiments, the channel elements communicate according to an OFDMA protocol with the mobile stations in cell 125. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 103. Antenna array 255 also sends to transceiver 250 reverse channel signals received from mobile stations in the coverage area of BS 103. In some embodiments, antenna array 255 is a multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during transmit and receive operations.

According to some embodiments, handoff controller 260 is capable of determining a list of candidate target base stations, including other macrocell base stations and femtocell base stations, for handoff. Handoff controller 260 is configured to dynamically adjust a threshold parameter used in inter-frequency (i.e., different frequency) hard handoffs. Handoff controller 260 also is configured to dynamically adjust the threshold parameter used in intra-frequency (i.e., same frequency) hard handoffs. Handoff controller 260 is operable to store the threshold parameters and list of candidate target base stations in a memory 270.

Memory 270 can be any computer readable medium, for example, the memory 270 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. Memory 270 comprises a random access memory (RAM) and another part of memory 270 comprises a Flash memory, which acts as a read-only memory (ROM).

Figure 3:
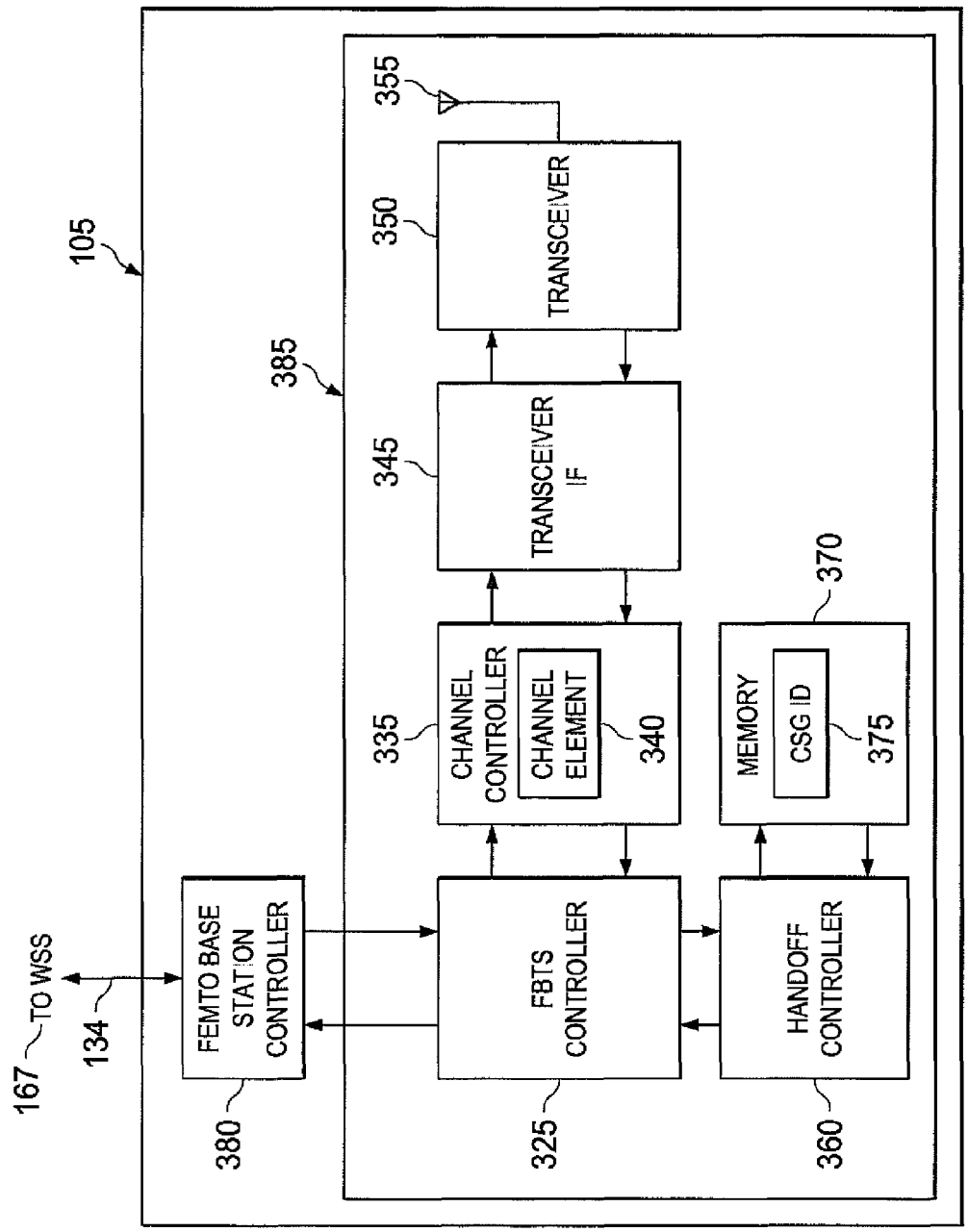
FIG. 3 illustrates a femtocell base station (FBS) 160 in greater detail according to one embodiment of the present disclosure.

FIG. 3 illustrates a femtocell base station (FBS) 160 in greater detail according to one embodiment of the present disclosure. The embodiment of FBS 160 illustrated in FIG. 3 is for illustration only. Other embodiments of the FBS 160 could be used without departing from the scope of this disclosure.

FBS 160 includes femtocell base station controller (FBSC) 380 and femtocell base transceiver subsystem (FBTS) 385. FBTS 385 also includes a handoff controller 360. The embodiment of the handoff controller 360 and memory 370 included, within FBTS 385 is for illustration only. Handoff controller 360 and memory 370 can be located in other portions of FBS 160 without departing from the scope of this disclosure.

FBSC 380 includes processing circuitry and memory capable of executing an operating program that controls the overall operation of FBTS 385. Under normal conditions, FBSC 380 directs the operation of channel controller 335, which contains a number of channel elements, including channel element 340, that perform bi-directional communications in the forward channels and the reverse channels. A forward channel refers to a channel in which signals are transmitted from the femto base station to the mobile station. A reverse channel refers to a channel in which signals are transmitted from the mobile station to the femto base station. Transceiver IF 345 transfers the bi-directional channel signals between channel controller 340 and RF transceiver unit 350.

Antenna array 355 transmits forward channel signals received from RF transceiver unit 350 to mobile stations in the coverage area of FBS 160. Antenna array 355 also sends to transceiver 350 reverse channel signals received from mobile stations in the coverage area of FBS 160. In a preferred embodiment of the present disclosure, antenna array 355 is a multi-sector antenna, such as a three-sector antenna in which each antenna sector is responsible for transmitting and receiving in a 120° arc of coverage area. Additionally, RF transceiver 350 may contain an antenna selection unit to select among different antennas in antenna array 355 during transmit and receive operations.

According to an exemplary embodiment of the present disclosure, handoff controller 360 is capable of determining a list of candidate target base stations for handoff. Handoff controller 360 is configured to dynamically adjust a threshold parameter used in inter-frequency (i.e., different frequency) hard handoffs. Handoff controller 360 also is configured to dynamically adjust the threshold parameter used in intra-frequency (i.e., same frequency) hard handoffs. Handoff controller 360 is operable to store the threshold parameters and list of candidate target base stations in a memory 370.

Memory 370 can be any computer readable medium, for example, the memory 370 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. Memory 370 comprises a random access memory (RAM) and another part of memory 370 comprises a Flash memory, which acts as a read-only memory (ROM). In some embodiments, memory 370 includes a CSG ID 375 that indicates an identity of FBS 160 and that FBS 160 is a closed subscriber group femto base station, or both.

Figure 4:
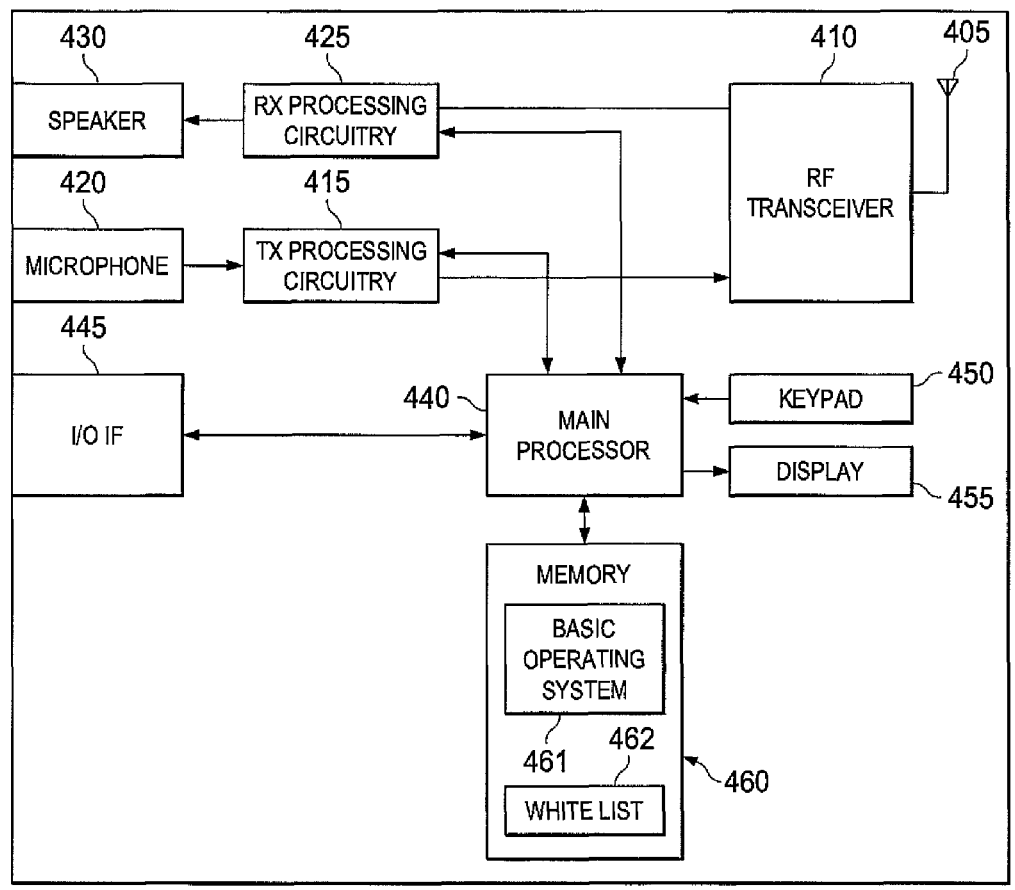
FIG. 4 illustrates wireless subscriber station (SS) 116 according to embodiments of the present disclosure.

FIG. 4 illustrates wireless subscriber station (SS) 116 according to embodiments of the present disclosure. The embodiment of SS 116 illustrated in FIG. 4 is for illustration only. Other embodiments of the SS 116 could be used without departing from the scope of this disclosure. It will be understood that although SS 116 is described for illustration and example only, descriptions can apply to SS 111-115 and 117 equally.

SS 116 includes antenna 405, radio frequency (RF) transceiver 410, transmit (TX) processing circuitry 415, microphone 420, and receive (RX) processing circuitry 425. SS 116 also includes speaker 430, main processor 440, input/output (I/O) interface (IF) 445, keypad 450, display 455, and memory 460. Memory 460 further includes basic operating system (OS) program 461 and white-list 462 including a plurality of CSG Identifications (CSGIDs) and/or BS identifications (BSIDs).

Radio frequency (RF) transceiver 410 receives from antenna 405 an incoming RF signal transmitted by a base station (e.g., either a macrocell base station or femtocell base station) of wireless network 100. Radio frequency (RF) transceiver 410 down-converts the incoming RF signal to produce an intermediate frequency (IF) or a baseband signal. The IF or baseband signal is sent to receiver (RX) processing circuitry 425 that produces a processed baseband signal by filtering, decoding, and/or digitizing the baseband or IF signal. Receiver (RX) processing circuitry 425 transmits the processed baseband signal to speaker 430 (i.e., voice data) or to main processor 440 for further processing (e.g., web browsing).

Transmitter (TX) processing circuitry 415 receives analog or digital voice data from microphone 420 or other outgoing baseband data (e.g., web data, e-mail, interactive video game data) from main processor 440. Transmitter (TX) processing circuitry 415 encodes, multiplexes, and/or digitizes the outgoing baseband data to produce a processed baseband or IF signal. Radio frequency (RF) transceiver 410 receives the outgoing processed baseband or IF signal from transmitter (TX) processing circuitry 415. Radio frequency (RF) transceiver 410 up-converts the baseband or IF signal to a radio frequency (RF) signal that is transmitted via antenna 405.

In some embodiments of the present disclosure, main processor 440 is a microprocessor or microcontroller. Memory 460 is coupled to main processor 440. According to some embodiments, part of memory 460 comprises a random access memory (RAM) and another part of memory 460 comprises a Flash memory, which acts as a read-only memory (ROM).

Main processor 440 executes basic operating system (OS) program 461 stored in memory 460 in order to control the overall operation of SS 116. In one such operation, main processor 440 controls the reception of forward channel signals and the transmission of reverse channel signals by radio frequency (RF) transceiver 410, receiver (RX) processing circuitry 425, and transmitter (TX) processing circuitry 415, in accordance with well-known principles.

Main processor 440 is capable of executing other processes and programs resident in memory 460. Main processor 440 can move data into or out of memory 460, as required by an executing process. Main processor 440 is also coupled to I/O interface 445. I/O interface 445 provides mobile station 111 with the ability to connect to other devices such as laptop computers and handheld computers. I/O interface 445 is the communication path between these accessories and main controller 440.

Main processor 440 is also coupled to keypad 450 and display unit 455. The operator of SS 116 uses keypad 450 to enter data into SS 116. Display 455 may be a liquid crystal display capable of rendering text and/or at least limited graphics from web sites. Alternate embodiments may use other types of displays.

Main processor 105 is configured to execute a plurality of instructions in memory 460 to determine when conditions are such that a handoff should be or can be performed. Main processor 440 further is configured to store one or more CSGIDs in the white list 462 of memory 460 for use in accessing CSG FBSs. When a user is a member (e.g., subscriber) of a CSG, the user is provided with one or more CSGIDs in order to access one or more respective FBSs. In some embodiments, the user's wireless device (e.g., SS 116) receives the CSGIDs wirelessly via one or more of the wireless connections between SS 116 and a BS and/or SS 116 and an FBS. In some embodiments, the user enters the CSGIDs into the wireless device (e.g., SS 116) using one or more of I/O IF 445, keypad 450 and display 455. Furthermore, the user can subscribe to multiple CSGs and, thus, receive multiple CSGIDs that correspond to the various CSGs to which subscriptions have been obtained and store them all in white list 462.

In some embodiments, the SS uses the stored CSGIDs in the white list 462 to determine whether a CSG base station is one of the base stations to which the SS subscribes. To search for a base station to which the SS is subscribed, the SS can perform a search as follows. The SS can obtain the synchronization channel of the base station, which includes the preamble or cell ID of the base station. The preamble or cell ID may be partitioned, so that each type of the cell (such as macro, CSG-Closed, CSG-Open, open, and such) may use a particular set of the preambles. The SS can have the information on which type of the cells uses which set of preambles. Based on the received preamble, the SS may determine the type of the base station (such as macro, CSG-Closed, CSG-Open, open, and such). The SS can also measure the signal strength of the base station on the synchronization channel.

The SS may also choose to obtain and decode the broadcast channel, where the SS can get the CSGID of the CSG base station. Then the SS can compare the received CSGID with the stored CSGID in the white list 462. If the received CSGID is in the white list 462, the detected CSG BS is one of the CSG cells to which the SS is subscribed. Based on the cell, the SS can determine whether the detected cell is a CSG-Closed BS to which the SS subscribes (if so, the CSG-Closed BS whose cell ID is included in the white list 462 is accessible to the SS as the SS is a member; if not, the CSG-Closed is inaccessible to the SS as the SS is a non-member). The SS may also determine whether the detected cell is a CSG-Open BS to which the SS subscribes (if so, the CSG-Open BS is accessible with higher priority and the MS is a member of it; if not, the femtocell is accessible but with lower priority and the MS is a non-member of it).

In some embodiments, when SS 116 encounters interference while still connected with BS 103, SS 116 and BS 103 are configured to follow a scanning procedure to measure the signal conditions (e.g. Received Signal Strength Indication (RSSI) of a serving BS (i.e BS 103) and other accessible base stations. Hereinafter accessible and inaccessible base stations include collectively refer to any type of base station including macrocell base stations and femtocell base stations. With respect to CSG femtocell base stations accessible base stations include CSG FBSs to which MS 116 is allowed access, such as CSG-Closed FBSs to which SS 116 is subscribed, and CSG-Open FBSs. With respect to CSG femtocells, inaccessible base stations include CSG-Closed FBSs to which MS 116 is not subscribed. If the signal from the serving BS 103 becomes weak and the signal strength of the reported candidate accessible base stations are not good enough for a handover, inaccessible base stations are scanned to determine whether certain trigger conditions for interference mitigation (IM) are satisfied. If so, IM is initiated.

In some embodiments, when SS 116 encounters interference from another BS (e.g. FBS 160) and is not connected to a serving BS (e.g. BS 103), then SS 116 may signal the interfering BS (i.e FBS 160) to request interference mitigation.

Embodiments in the present disclosure are described using macrocell base stations as the serving base station and femtocell base stations the interfering base station. However, this is merely for illustrative purposes, as the invention in this disclosure is not limited to macrocells or femtocells. That is, BS 103 and FBS 160 in the following disclosure can be replaced by any base station such as macrocell, femtocell, picocell base station, and so forth. For example, the serving base station may be a femtocell base station, and the interfering base station may be a macrocell base station. In other embodiments, the serving base station and the interfering base station may both be femtocell base stations.

IM When SS Not Connected to a Serving BS

Figure 5:
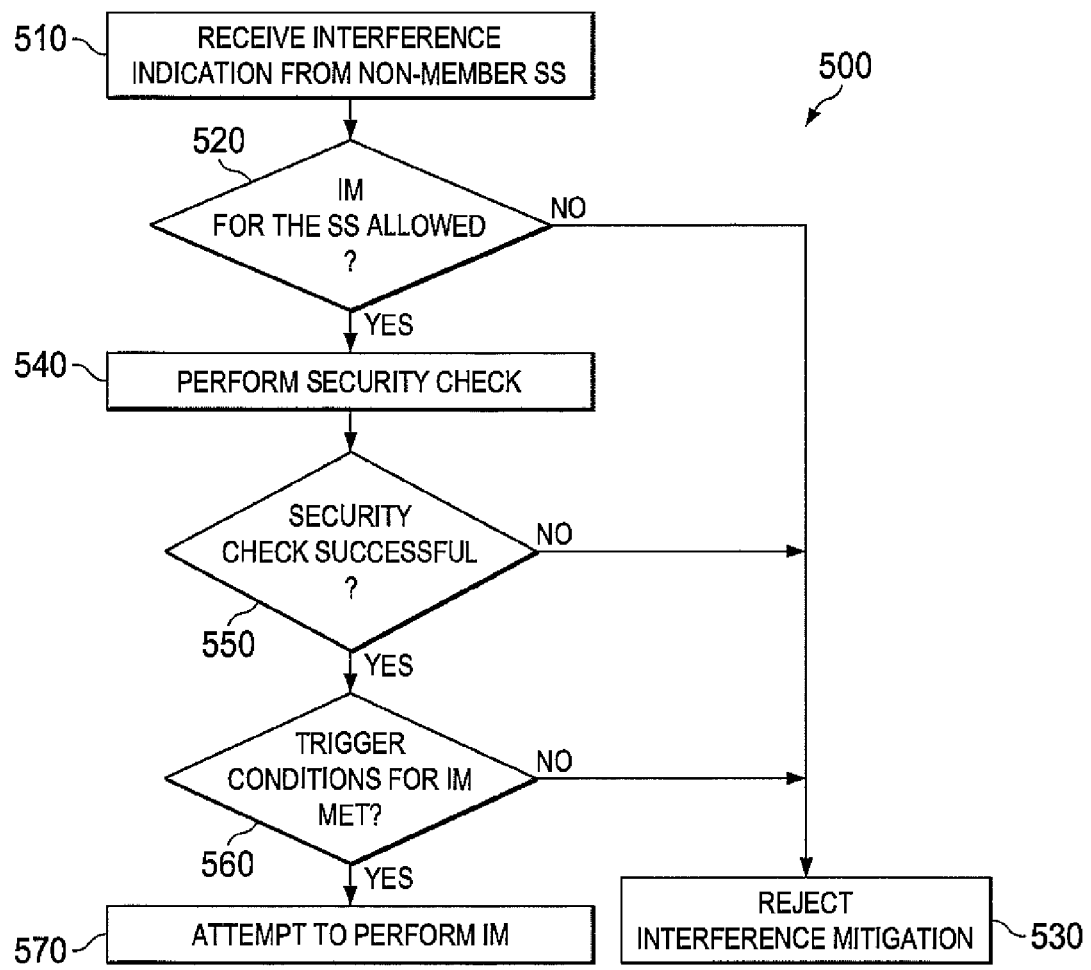
FIG. 5 illustrates a process in an interfering BS for determining whether to perform IM when an SS is not connected to a serving BS, according to an embodiment of the present disclosure.

FIG. 5 illustrates a process in an interfering BS for determining whether to perform IM when an SS is not connected to a serving BS, according to an embodiment of the present disclosure. In essence, process 500 is applicable when there is no serving BS that can negotiate IM with an interfering BS (e.g. FBS 160) on behalf of an SS (e.g. SS 116). With reference to FIG. 5, FBS 160 of FIG. 1 is assumed to be a CSG-Closed BS, and SS 116 is not a member of FBS 160.

When SS 116 is not connected to BS 103 or any other serving BS, SS 116 may send a signal directly to FBS 160, to request for or indicate to FBS 160 that SS 116 is experiencing interference from the CSG-closed FBS 160 if certain conditions (such as trigger conditions to send a signal directly to CSG-Closed BS to indicate that the non-member SS is experiencing interference from CSG-closed BS) are satisfied.

The conditions to send a signal directly to CSG-Closed BS to indicate that the non-member SS is experiencing interference from the CSG-Closed BS or to request IM may include, but are not limited to, the non-member SS has lost connection with BS; for a period of time greater than a threshold duration, the CSG-Closed BS is the possible interfering BS; the CSG-Closed BS is the interfering BS with the highest signal strength that causes the non-member SS to not be able to hear any accessible BS (including macro, micro, open femto, CSG-open femto, its subscribed CSG-closed femto, and such); the inaccessible BS has highest signal strength (such as RSSI) and/or is greater than the next highest signal strength (such as RSSI) by a threshold for a period of time; and/or the inaccessible BS is the BS with a signal strength (such as an RSSI) higher than the minimum acceptable RSSI for the SS to access a BS for a period of time. The signal strength can be the measurement of BS downlink signals (e.g., synchronization channel, broadcast channel such as super frame header, pilot, and such), such as an average or instant SINR (the ratio of signal and the sum of the interference and noise), CINR (the ratio of carrier and the sum of the interference and noise), CIR (carrier noise ratio), CNR (carrier noise ratio), RSSI (received signal strength indicator), CQI (channel quality indicator), and such. All conditions discussed in the present disclosure may be one or a combination of the conditions mentioned above and/or other conditions.

In some embodiments, SS 116 may directly request FBS 160 for IM or indicate to the BS that the non-member SS is experiencing interference through a ranging request message (RNG-REQ) that includes an indication (e.g. a reserved or an assigned Ranging Purpose Indication code) to request IM or to indicate that the SS is experiencing femto interference, because SS 116 is in a coverage hole caused by FBS 160. The indication may represent exceptional circumstances for non-member access to a CSG-Closed BS. For example, if a non-member SS (e.g. SS 116) is in an outage because of the interfering inaccessible BS (such as CSG-Closed FBS 160 to which SS 116 is not subscribed), and SS 116 does not have any connection with neighboring BS, SS 116 can indicate this problem to the interfering CSG-Closed FBS 160 by sending a signal in a random access procedure, such as using a specific ranging purpose indication code for such purpose in the ranging request message.

In block 510, FBS 160 receives the signal which indicates to FBS 160 that the non-member SS 116 is experiencing interference or to request IM, such as ranging request (RNG-REQ) with purpose indication set for this purpose from SS 116. Upon determining decoding the indication indicating that the non-member SS 116 is experiencing interference or to request for IM, FBS 160 checks its policy to determine whether such IM (e.g. IM requested directly from an SS) is allowed in block 520.

If the policy does not allow such IM, FBS 160, in block 530, responds with a message (e.g. RNG-RSP) to SS 116 that the request is denied. In an embodiment, the message may also notify the SS 116 not to try again. For example, RNG-RSP may have a two bit indicator (IM Indication) set to '00', which means IM not allowed and not to try again. If the policy allows such IM, the CSG-closed femto ABS may further perform a security check regarding SS 116 in block 540. The security check may be to determine whether SS 116, despite being a non-member, is a legal user. The security check process may be an AAA (authentication, authorization, accounting) related process, which may include authentication, authorization, accounting, and such. The security check may include the operation in network entities such as BS 103 and backhaul network. If the security check result in block 550 is that SS 116 is illegal, it rejects any request from SS 116 by sending the RNG-RSP with the IM Indication set to '00' (i.e. IM not allowed and not to try again).

If the security check result is that SS 116 is a legal user but a non-member, then the FBS 160, in block 560, checks the IM policy to determine whether trigger conditions to initiate IM directly with an SS are satisfied. That is, if the policy allows IM for this SS 116, the FBS 160 may further request SS 116 (e.g. via SCN-RSP) to send a scan report. SS may send the scan report (e.g. SCN-REP) to FBS 160. FBS 160 then determines, based on the scanning results in the SCN-REP, whether the conditions to initiate IM directly with an SS are satisfied. In some embodiments, blocks 520-550 may be combined, or the sequence of the checking policy to determine whether such IM is allowed and the security check may be changed. In some embodiments, some of the blocks 520-560 may be omitted.

As such, the trigger conditions for a CSG-Closed BS (e.g. FBS 160) to initiate IM directly with an SS may include, and are not limited to, the CSG-Closed BS has received a signaling which indicates to the CSG-Closed BS that the non-member SS (e.g. SS 116) is experiencing interference or to request IM, such as ranging request (RNG-REQ) with a purpose indication set for this purpose from SS 116; the non-member SS has been security checked as a non-member of the CSG-Closed BS but a legal system user; the non-member SS has reported to the CSG-Closed BS all the base stations it can find and their respective signal strengths; and/or the CSG-Closed BS is the possible BS that the non-member SS can find, or the BS with the highest strength, that causes the non-member SS to be unable to hear any accessible BS (including macrocell BS, microcell BS, open BS, CSG-Open BS, its subscribed CSG-Closed BS, and such); the CSG-Closed BS has highest signal strength (such as CINR) and/or is greater than the next highest signal strength (such as CINR) by a threshold for a period of time; and/or the CSG-Closed BS is the BS with signal strength (such as CINR) higher than the minimum acceptable signal strength (such as CINR) for the SS to access a BS for a period of time. The signal strength can be the measurement of BS downlink signals (e.g., synchronization channel, broadcast channel such as super frame header, pilot, and such), such as an average or instant SINR (the ratio of signal and the sum of the interference and noise), CINR (the ratio of carrier and the sum of the interference and noise), CIR (carrier noise ratio), CNR (carrier noise ratio), RSSI (received signal strength indicator), CQI (channel quality indicator), and such. All conditions discussed in the present disclosure may be one or a combination of the conditions mentioned above and/or other conditions.

If the trigger conditions to initiate IM directly with an SS are not met (or there may be a policy that only some SSs or partners can enjoy IM), FBS 160 (in block 530) may send a rejection message (e.g. RNG-RSP) to SS 116 with the IM Indication set to '00' (i.e. IM not allowed and not to try again). In some embodiments, this may indicate that SS 116 is not to try again under the same scanning results.

If the trigger conditions to initiate IM directly with an SS are satisfied, FBS 160 may initiate IM with SS 116 in block 570 and send a notification (e.g. via RNG-RSP with IM Indication set to '01'). For example, if the policy allows FBS 160 to choose a new frequency allocation (FA), and it succeeds, FBS 160 responds to SS 116 with a signaling (such as an RNG-RSP message with IM Indication '01'), which means IM has been performed successfully and SS 116 should continue to look for another BS to access. If the policy allows FBS 160 to perform power control, and FBS 160 successfully reduces the transmission power, such as power on downlink control channel (such as synchronization channel or broadcast channel), power on the control messages on data channel, power on data channel, and such, FBS 160 responds with an RNG-RSP message with IM Indication '01', which means IM performed successfully and SS 116 should continue to look for another other BS to access. Upon receiving the response, SS 116 may try to find another BS to access.

In an embodiment, the attempt to initiate IM by FBS 160 may fail even though the trigger conditions to initiate IM directly with an SS were satisfied. For example, if the policy allows FBS 160 to choose a new FA, but there is no new FA available, and if the policy allows power control, but FBS 160 does not reduce its transmission power, such as power on downlink control channel (such as synchronization channel or broadcast channel), power on the control messages on data channel, power on data channel, and such, (or cannot reduce its power any further), FBS 160 responds with a signaling (such as an AAI_RNG-RSP message with IM Indication '10'), which means IM allowed but failed. Upon receiving the response, SS 116 may retry indication of the experiencing interference by sending the RNG-REQ message with Ranging Purpose Indication for this purpose being set.

In some embodiments, if the policy allows a non-member SS (e.g. SS 116) to temporarily allow access FBS 160 with lower priority than member SSs, FBS 160 may send a signaling to the SS, (such as the RNG-RSP message with IM Indication '11'), which means SS 116 is allowed to access FBS 160 with lower priority. SS 116 may need to perform a location update, and FBS 160 should forward paging to SS 116. That is, FBS 160 may allow non-member SS 116 to access it and be served at lower priority as long as the Quality of Service (QoS) of member SSs (e.g. SS 117) in it is CSG is not compromised. FBS 160 may temporarily be a virtual CSG-Open BS (i.e. only in the sense of service/access) for non-member SS 116, but FBS 160 does not actually change the type from CSG-Closed to CSG-Open. It is noted that an actual type change may cause the change of the cell ID of FBS 160 if CSG-Closed and CSG-Open statuses are indicated by the partition of the cell IDs. In some embodiments, FBS 160 may change its type to CSG-Open. If the cell IDs for CSG-Closed and CSG-Open are from different sets, the CSG-Closed BS may need to change its cell ID.

If SS 116 is given temporary access to FBS 160, SS 116 may have a location update to the paging controller if FBS 160 has a different paging group ID than the ones that SS 116 has before it gains access to FBS 160. While SS 116 is connected to FBS 160, FBS 160 should forward the paging to SS 116.

In some embodiments, the policy in FBS 160 may allow only one type of IM or multiple types of IM. If the policy in FBS 160 allows multiple types of IM, the conditions for each type of IM (e.g. Tx power reduction, changing FA, allowing temporary access or changing from CSG-Closed type to CSG-Open type, and such) may have separate conditions or the same conditions. The IM policies in FBS 160 that determine whether to accept or reject the IM request and how to perform IM may be defined by the service provider of FBS 160. In an embodiment, the policies in FBS 160 may at least be partially defined and/or modified directly in the FBS 160 locally or remotely. In an embodiment, the policies may be sent to SS 116, e.g., via pre-provisioning, via registration response, or via some other messages.

In some embodiments, the IM Indication in the response to the IM request may be more robust. In an embodiment, a bitmap may be used to indicate the policies that are successful or not. For example, there may be two bits for each policy, where the first bit states whether the policy is supported ('0' for not allowed, '1' for allowed), and the second bit states whether the policy is successfully executed ('0' for failed and '1' for successful). In another embodiment, a number of bits may correspond to an index of results (e.g. '000': IM not allowed, not to try again [upon receiving it, SS should not try again]; '001': IM allowed, but resource adjustment failed, may try again [upon receiving it, SS may try again, resend IM request, or not to try]; '010': IM allowed, FA changed, try to find accessible BS to access [upon receiving it, SS may try to find accessible BS to access. If it cannot find such, it may resend IM request]; '011': IM allowed, DL TX control channel power reduced, try to find accessible BS to access [upon receiving it, SS may try to find accessible BS to access. If it cannot find such, it may resend IM request]; '100': IM allowed, allow SS to access in lower priority, but no spare resource. [upon receiving it, SS may try again, or not to try]; '101': IM allowed, allow SS to access in lower priority, have spare resource. [upon receiving it, SS accesses the said inaccessible BS]; '110', '111': reserved). These are just examples. Similar examples can be easily written based on the policies for IM.

Figure 6:
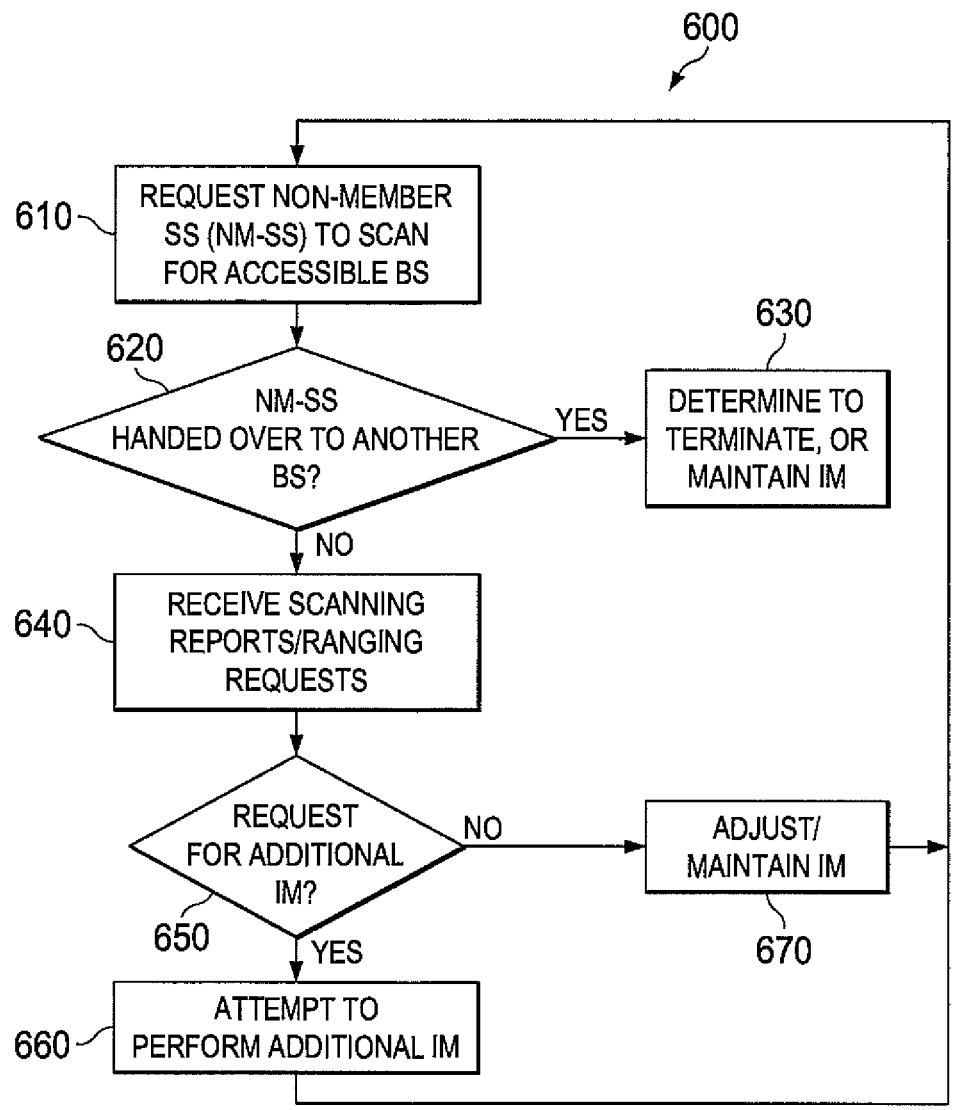
FIG. 6 illustrates a process in an interfering BS for determining whether to maintain, terminate, or adjust IM that has been performed, according to an embodiment of the present disclosure.

FIG. 6 illustrates a process in an interfering BS for determining whether to maintain, terminate, or adjust IM that has been performed. Process 600 is may be applicable to both situation in which the interfering BS (e.g. FBS 160) is communicating with a serving BS (e.g. BS 103) that is negotiating on behalf of an SS (e.g. SS 116) or when the interfering BS is communicating directly with an SS because there is no serving BS that can negotiate IM on behalf of the SS. With reference to FIG. 6, FBS 160 of FIG. 1 is assumed to be a CSG-Closed BS, and SS 116 is not a member of FBS 160, and BS 103 is an accessible BS to SS 116. In addition, process 600 assumes that FBS 160 is currently performing IM for SS 116.

In block 610, FBS 160 requests a non-member SS (e.g. SS 116) to scan for accessible BSs. As discussed previously, FBS 160 may request SS 116 to scan for accessible BSs in the same message (RNG-RSP) that indicates IM was successfully initiated.

In block 620, FBS 160 determines whether SS 116, for which IM has been performed, is handed over to an accessible BS, such as BS 103. That is FBS 160 determines whether trigger conditions to stop performing IM are met. Trigger conditions to stop performing IM may include, and are not limited to, a timer for performing IM has expired, the non-member SS (e.g. SS 116) has scanned and found an accessible BS (e.g. BS 103) with a signal strength (e.g., an average SINR, CINR, CIR, CNR, RSSI, CQI, and such) larger than a threshold, or such signal strength larger than a threshold for a period of time greater than a threshold duration; the inaccessible BS that has performed IM (e.g. FBS 160) has a signal strength that is lower than a threshold for a period of time greater than a threshold duration; FBS 160 does not have the highest signal strength for a period of time greater than a threshold duration; and/or FBS 160 has signal strength that is lower than an accessible BS by an amount greater than a threshold for a time greater than a threshold duration, and so forth. Or the conditions can be the conditions for handover. Note that each of the thresholds mentioned in the present disclosure can be independent and different from other thresholds. As already discussed, all trigger conditions can be one or a combination of the conditions mentioned above and/or other conditions.

If the trigger conditions to stop performing IM are satisfied, FBS 160 may decide to terminate or maintain IM in block 630. For example, FBS 160 may decide to maintain IM if all member SSs (e.g. SS 117) have satisfactory signal strengths that meet the minimum power level, or if there are other non-member SSs that still need IM. Alternatively, FBS 160 may decide to terminate IM entirely or partially terminate IM by reducing the amount of IM or, if FBS 160 is concurrently performing multiple types of IM, terminating only one or several types of IM while maintaining at least one type of IM.

If SS 116 was given temporary access to FBS 160, SS 116 may have had a location update to the paging controller if FBS 160 has a different paging group ID than the ones that SS 116 had before gaining temporary access to FBS 160. While accessing FBS 160, FBS 160 forwarded the paging to SS 116. After SS 116 hands out of FBS 160, SS 116 may have another location update, if applicable. At that point FBS 160 will no longer forward paging to SS 116.

If SS 116 has not handed over (or is not being handed over) to another BS, FBS 160 may receive scanning reports (SCN-REP) with measured signal strengths or ranging requests (RNG-REQ) for additional IM in block 640. The scanning reports may be received from both member SSs (SS 117) and non-member SSs (SS 116). As mentioned previously, each SS may send the scanning reports autonomously by each SS periodically or based on trigger conditions. The FBS 160 may also request each SS to send a scanning report through an unsolicited message (e.g. via an unsolicited scanning response (SCN-RSP) or ranging response (RNG-RSP)).

In block 650, FBS 160 determines whether SS 116 is requesting for additional IM. If SS 116 is requesting additional IM, FBS 160 attempts to increase IM in block 660. FBS 160 may first determine whether trigger conditions for additional IM have been met. The trigger conditions for additional IM may be similar to the trigger conditions to initiate IM directly with an SS. FBS 160 may also consider whether performing the additional IM will cause member SSs to not have satisfactory signal strengths that meet the minimum power level. If the trigger conditions for additional IM are satisfied and member SSs still have satisfactory signal strengths, FBS 160 may initiate an additional IM in block 650.

For example, if FBS 160 is still the only BS with an RSSI or CINR higher than the minimum acceptable RSSI or CINR, SS 116 can retry IM request or "experiencing interference from CSG-Closed BS"-indication by sending another RNG-REQ message with Ranging Purpose Indication set for this purpose. SS 116 may retry until it receives a RNG-RSP message with IM Indication '10', which means IM allowed but failed. That is, SS 116 and FBS 160 may iteratively adjust IM until SS 116 stops requesting IM or until FBS 160 indicates that IM is allowed but failed. In an embodiment, SS 116 may have separate trigger conditions to determine whether to subsequently request IM after IM has already been initiated successfully with FBS 160. Similarly, in an embodiment, FBS 160 may have trigger conditions to determine whether to subsequently adjust IM.

If the trigger conditions for additional IM are not satisfied, FBS 160 will not perform additional IM and may send a rejection message (e.g. RNG-RSP) to SS 116 with the IM Indication set to '00' (i.e. IM not allowed and not to try again). In some embodiments, this may indicate that SS 116 is not to try again under the same scanning results. If the trigger conditions for additional IM are satisfied but resources are not available or performing the additional IM will cause member SSs to not have satisfactory signal strengths that meet the minimum power level, then FBS 160 may send a rejection message (e.g. RNG-RSP) to SS 116 with the IM Indication set to '10' (i.e. IM allowed but not successful). In addition, FBS 160 may reach out through the backhaul (or SON server, BS controller, and such) to request for help from an accessible BS that is near SS 116 (e.g. negotiate changes to make accessible BS available for handover).

If SS 116 is not requesting for additional IM (e.g. FBS 160 has only received scanning reports from member and/or non-member SSs), FBS 160 (in block 670) may determine whether to maintain or adjust IM based on the scanning reports. For example, FBS 160 may check whether member SSs have satisfactory signal strengths that meet the minimum power level. If so, FBS 160 may determine to maintain IM. If one of the member SSs does not have a satisfactory signal strength, then FBS 160 may adjust IM appropriately. FBS 160 may then return to block 610 and request SS 116 to scan for an accessible BS.

The approaches described in the previous embodiments, in which a non-member SS directly requests an inaccessible BS for IM, can be used for a non-member SS (e.g. SS 116) in idle mode or connected mode. For example, for the trigger conditions to initiate IM directly with an SS, the above-mentioned approach for a non-member SS that is not connected to any BS; and for the trigger conditions to stop performing IM, it can be for an SS in any mode/state.

Figure 7:
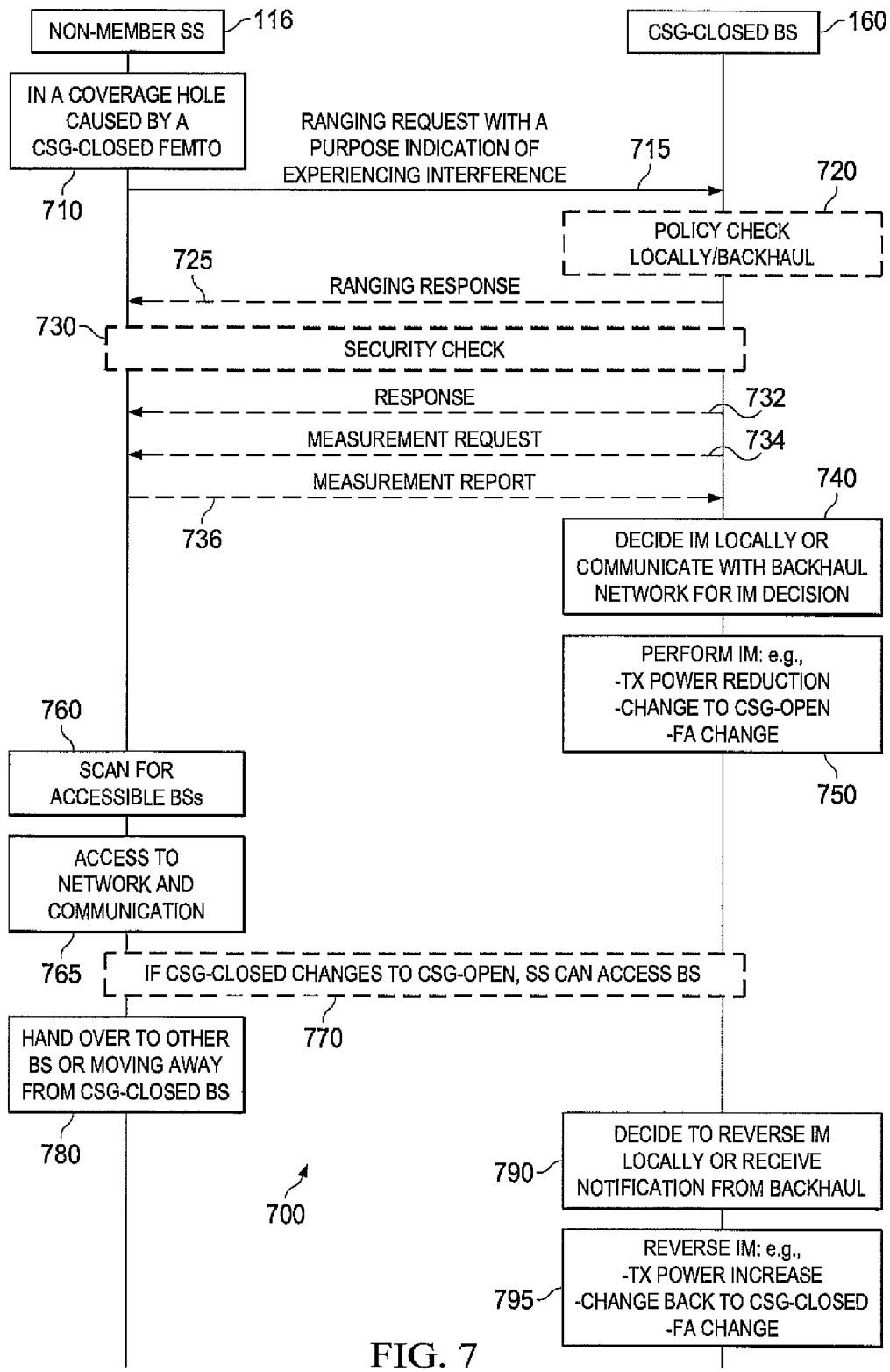
FIG. 7 illustrates a high-level signal flow that is representative of direct communications between a non-member SS and a CSG-Closed BS for interference management when the non-member SS is not connected to a serving BS, according to some embodiments of the present disclosure.

FIG. 7 illustrates an exemplary signal flow that is representative of direct communications between a non-member SS and a CSG-Closed BS for interference management when the non-member SS is not connected to a serving BS, according to some embodiments of the present disclosure. Signal flow 700 reflects some embodiments discussed with respect to processes 500 and 600. It is also assumed that FBS 160 is a CSG-Closed BS to which SS 116 is not a member.

In block 710, an SS (e.g. SS 116) is not connected to any BS due to being in a coverage hole caused by an interfering BS that is inaccessible (e.g. FBS 160). That is, SS 116 may have lost connection to its serving BS due to strong interference from FBS 160, or SS 116 may have been in an idle mode. Upon determining that certain conditions (e.g. conditions to send a signal directly to CSG-Closed BS to indicate that the non-member SS is experiencing interference from the CSG-closed BS) are satisfied, SS 116 may directly request FBS 160 for IM or indicate to FBS 160 that non-member SS 116 is experiencing interference through a ranging request message (RNG-REQ) 715 that includes an indication (e.g. a reserved or an assigned Ranging Purpose Indication code).

In block 720, FBS 160 may conduct a policy check to determine whether such type of IM request (e.g. direct IM request from a non-member SS) is allowed. If such type of IM request is not allowed, FBS 160 may respond with a message (e.g. RNG-RSP) to SS 116 that the request is denied. In an embodiment, the message may also notify the SS 116 not to try again.

If the policy allows such IM, the CSG-closed femto ABS may further perform a security check regarding SS 116 in block 730. The security check may be to determine whether SS 116, despite being a non-member, is a legal user. The security check process may be an AAA (authentication, authorization, accounting) related process, which may include authentication, authorization, accounting, and such. The security check may include the operation in network entities such as BS 103 and backhaul network. If the security check result in block 730 is that SS 116 is illegal or that IM service is not allowed for the particular non-member SS 116, it rejects any request from SS 116. The rejection may be conveyed by a ranging response message, or registration response message.

If the security check result is that policy allows IM for SS 116, FBS 160 checks whether trigger conditions to initiate IM directly with an SS are satisfied. That is, if the policy allows IM for this SS 116, the FBS 160 may further request SS 116 through a measurement request 734 (e.g. via SCN-RSP) to send a scan report. SS may send the measurement report 736 (e.g. via SCN-REP) to FBS 160. In some embodiments, blocks 720, 730, signals 725, 732, 734, 736 may be combined and some of the may be omitted, or the sequence of the checking policy to determine whether such IM is allowed and the security check may be changed.

In block 740, FBS 160 determines, based on the measurement report 736, whether the conditions to initiate IM directly with an SS are satisfied. In some embodiments, FBS 160 may make this determination locally or communicate with a network entity through the backhaul to make the determination.

Assuming that the conditions to initiate IM directly with SS 116 are satisfied, FBS 160 performs IM in block 750. Based on its policy, which may be defined locally or by the service provider, FBS 160 may perform any one or combination of IM measures, including but not limited to, Tx power reduction, change (actually or virtually) from CSG-Closed to CSG-Open (depending upon the circumstances as will be discussed below), and/or FA change, and such. Though not illustrated in signal flow 700, FBS 160 may send a notification (e.g. via RNG-RSP) to SS 116. FBS 160 may also request SS 116 to continue scanning for accessible BSs.

In block 760, SS 116 continues to scan for accessible BSs. In block 765, if SS 116 still has not found an accessible BS and the interference from FBS 160 is too strong, SS 116 may send the request again for IM, so the FBS may perform additional IM to FBS 160. FBS 160 may attempt to perform additional IM if policy allows. If SS 116 finds an accessible BS to which it can access the network, the SS may perform network entry, obtain access, and establish communication.

In block 770, if FBS 160 changes from the CSG-Closed to the CSG-Open type, SS can access FBS 160. If FBS 160 has changed to a virtual CSG-Open type (i.e. to provide temporary access to a particular non-member SS (assume SS 116 is such) to whom the FBS would grant access), the particular non-member SS 116 will be allowed to access FBS 160 with lower priority than member SSs, while continuing to use a cell ID for CSG-Closed type and continuing to operate as a CSG-Closed type in the system, i.e., being closed to those non-member SSs who do not have access granted by the FBS, i.e., remaining inaccessible to other non-member SSs (such as those non-member SSs that have not requested for interference mitigation) to whom the FBS would not grant access. In contrast, if FBS 160 has actually changed to the CSG-Open type, FBS 160 may operate as a normal CSG-Open BS, which allows every non-member SS to access with lower priority than its member SS. In block 780, SS 116 hands over to an accessible SS if the accessible BS meets handover conditions (e.g. because SS 116 is moving away from FBS 160). In block 790, FBS 160 determines whether to reverse IM locally or may receive a notification from a network entity through the backhaul. In block 795, FBS 160 may choose to reverse any or all of the IM measures that are currently being performed, either fully or partially, depending upon its IM policies and/or circumstances (e.g. IM being performed for other non-member SSs).

The following paragraphs discuss more on interference management. The embodiments in the following paragraphs do not necessarily need to follow the flow of FIG. 5 or FIG. 6. Although the embodiments in the following paragraphs are described with respect to when an SS does not have a serving BS or is not connected to a serving BS, the embodiments are not so limited. For example, the embodiments may be applied to other settings such as when the SS is connected to the serving BS.

Change from CSG-Closed to CSG-Open

In some embodiments, the policy may allow FBS 160 to actually change to or request to a network entity via backhaul to actually change from a CSG-Closed type to a CSG-Open type. That is, if the trigger conditions to initiate IM directly with an SS are met, FBS 160 may then attempt to actually change from being a CSG-Closed BS to a CSG-Open BS. It is noted that this is distinguished from temporarily allowing access to a non-member SS that is requesting IM (i.e. becoming a virtual CSG-Open BS), as discussed in previous embodiments. Unlike a virtual CSG-Open BS, if cell ID partitioning is used to differentiate CSG-Closed and CSG-Open type, an actual change from CSG-Closed to CSG-Open (or an actual change from CSG-Open to CSG-Closed) needs a cell ID change, while in a virtual change from CSG-Closed to CSG-Open, the cell ID may be kept the same.

Figure 8:
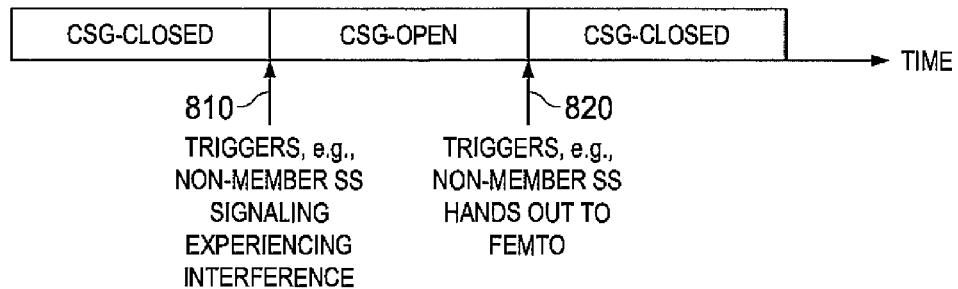
FIG. 8 illustrates a timeline for when a CSG-Closed BS (e.g. FBS 160) performs IM by changing from a CSG-Closed type to a CSG-Open type, according to an embodiment of the present disclosure.

FIG. 8 illustrates a timeline for an example in which a CSG-Closed BS (e.g. FBS 160) performs IM by actually changing from a CSG-Closed type to a CSG-Open type and back. At time 810, FBS 160 determines that the trigger conditions to initiate IM directly with a non-member SS (e.g. SS 116) are met and attempts to change from the CSG-Closed type to the CSG-Open type. In an embodiment, FBS 160 may communicate with the backhaul or some network entity to coordinate the interference mitigation process.

When the type change request is made, a new cell ID may be assigned from the cell ID pool if different types of CSG BSs use different sets of cell IDs. The new cell ID assignment can be done via the backhaul, e.g., by a Self-Organizing Network (SON) server, macro BS (e.g. BS 103), BS controller, by an operator, and others that have such privileges. The new cell ID and effective timing should be notified to the SSs in the coverage area of FBS 160, and to the neighbor BSs to update the respective neighbor lists.

The trigger conditions to actually change to CSG-Open type may include, and are not limited to, the same or similar trigger conditions in the embodiments above, as well as other settings and approaches in the embodiments above. For example, the trigger conditions to change to CSG-Open type may require that other IM measures were unsuccessful and/or the requesting SS is an exceptional class (e.g. related to emergency service, government function, or other high priority subscriber).

At time 820, if the trigger conditions to terminate IM are met, the non-member SS (e.g. SS 116) should hand out from FBS 160, and FBS 160 may consequently change back to or request to change back to the CSG-Closed type.

In some embodiments, a user may be able to manually set a CSG BS (e.g. FBS 160) into different types (e.g., from CSG-Closed to CSG-Open and vice versa, from CSG-Open to Open and vice versa, and so forth). In an embodiment the user may use an SS (e.g. SS 116 or SS 117) to send a signal to FBS 160 to set the type, or the user may change the type of FBS 160 online. The manual change can generate a change request to the higher layer and backhaul. When the type change request is made, a new cell ID should be assigned from the cell ID pool if different types of BSs use different sets of cell IDs. The new cell ID assignment can be done via the backhaul (e.g., by the SON server, macro BS, BS controller, by operator online, and so forth). The use for these embodiments may be, for example, an FBS user can temporarily change the BS type to allow guests/foreign users by a manual configuration, and then change the type back to CSG-Closed after guests leave.

Change from CSG-Closed to Virtual CSG-Open

In some embodiments, the policy may allow a CSG-Closed BS (e.g. FBS 160) to temporarily grant access to a requesting non-member SS (e.g. SS 116). That is, if the trigger conditions to initiate IM directly with an SS are met, FBS 160 may then determine whether to temporarily become a virtual CSG-Open BS. As already noted, a virtual CSG-Open BS distinguished from an actual CSG-Open BS in that a virtual CSG-Open BS may keep on using the cell ID assigned for CSG-Closed type if two different sets of cell IDs are assigned to CSG-Closed and CSG-Open respectively. A virtual CSG-open BS may only grant temporary access to specified non-member SSs (e.g. SS 116) while continuing to operate as a CSG-Closed type to those non-member SSs that have not been granted access by the FBS, i.e., remaining inaccessible to other non-member SSs (such as those non-member SSs that have not requested for interference mitigation) to whom the FBS would not grant access. In another embodiment, the temporary access to a non-member BS granted by a virtual CSG-Open BS may be at a lower priority than member SSs.

Figure 9:
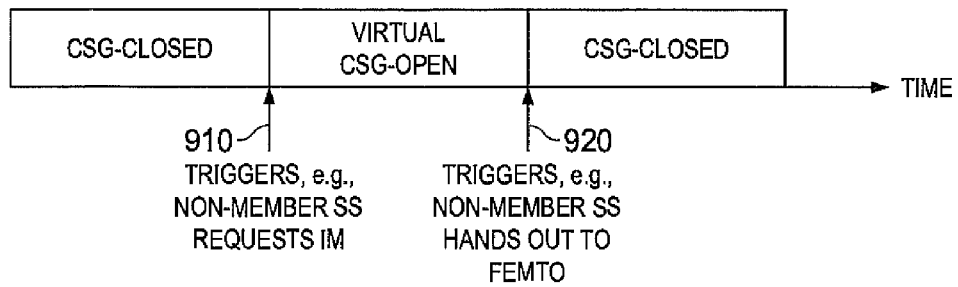
FIG. 9 illustrates a timeline for when a CSG-Closed BS (e.g. FBS 160) performs IM by temporarily becoming a virtual CSG-Open type, according to an embodiment of the present disclosure.

FIG. 9 illustrates a timeline for an example in which a CSG-Closed BS (e.g. FBS 160) performs IM by temporarily becoming a virtual CSG-Open type. At time 910, FBS 160 determines that the conditions to allow a non-member SS (e.g. SS 116) to temporarily access FBS 160 are met and changes to a virtual CSG-Open type.

When FBS 160 becomes a virtual CSG-Open type, a new cell ID does not have to be assigned from the cell ID pool as FBS 160 remains to be a CSG-Closed BS with respect to other non-member SSs.

Once FBS 160 allows SS 116 to access FBS 160, SS 116 may have a location update to the paging controller if FBS 160 has a different paging group ID than the ones SS 116 has before it gained temporary access to FBS 160. If there is paging to SS 116, FBS 160 should forward the paging to SS 116.

The conditions for temporarily changing to a virtual CSG-Open type may include, and are not limited to, the same or similar trigger conditions in the embodiments above, as well as other settings and approaches in the embodiments above. For example, the conditions to change to a virtual CSG-Open type may require that other IM measures were unsuccessful and/or the requesting SS is an exceptional class (e.g. related to emergency service, government function, or other high priority subscriber).

At time 920, if the trigger conditions to terminate IM are met, the non-member SS (e.g. SS 116) should hand out from FBS 160, and FBS 160 may consequently change back to or request to change back to the CSG-Closed type. When SS 116 hands out of FBS 160, SS 116 may have another location update if applicable, such that FBS 160 will no longer forward the paging for SS 116.

TX Power Reduction

Figure 10:
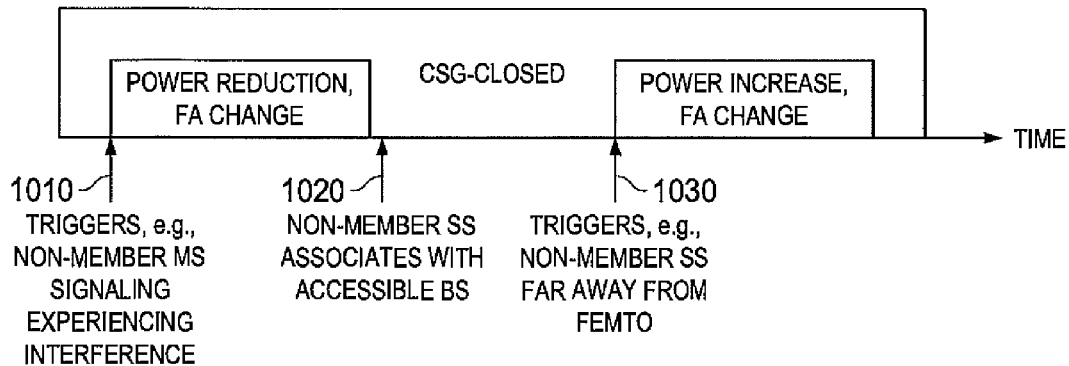
FIG. 10 illustrates a timeline for when a CSG-Closed BS performs IM by reducing its Tx power to help a non-member SS connect to an accessible BS, according to an embodiment of the present disclosure.

FIG. 10 illustrates a timeline for an example in which a CSG-Closed BS (e.g. FBS 160) performs IM by reducinges its Tx power to help a non-member SS (e.g. SS 116) connect to an accessible BS (e.g. BS 103). At time 1010, FBS 160 determines that conditions to initiate IM directly with SS 116 are met. That is, if the policy allows FBS 160 to perform downlink Tx power control (such as downlink control channel, and such), FBS 160 requests member SSs in its coverage through a message (e.g. unsolicited SCN-RSP) to measure and report the received power. FBS 160 may also send the minimum required power to its member SSs (e.g. SS 117). Member SSs may send back to FBS 160 the power difference of the received power and the minimum required power if the minimum required power is decided at FBS 160, or member SSs may send both the minimum required power and the difference of the received power and minimum required power to the FBS 160 if the minimum required power is defined in the member SS. FBS 160 may reduce its downlink power (such as control channel power, and such) so that the received power by its member SSs (e.g. SS 117) is no less than the minimum required power.

At time 1020, if SS 116 determines that BS 103 meets handover conditions, SS 116 may connect to BS 103. At time 1030, if FBS 160 determines that conditions to terminate or reverse IM are met, (e.g. the signal strength of FBS 160 is lower than BS 103 by an amount greater than a threshold for a time greater than a threshold duration, FBS 160 may increase its downlink transmission power. As discussed previously, FBS 160 may or may not immediately terminate or reverse IM when SS 116 connects to an accessible BS as FBS 160 may be performing IM for other SSs.

In an embodiment in which the policy allows Tx power adjustment, FBS 160 may control the downlink Tx power (such as the power of the control channel, and such) or negotiate Tx power with non-member SS accessible base stations (e.g. BS 103) via backhaul or via a Self-Organizing Network (SON) server. That is, if the trigger conditions to initiate IM directly with an SS are met, FBS 160 can then try to reduce its Tx power.

For example, if there are member SSs (e.g. SS 117) that FBS is serving (may include all SSs whether in connected state, idle state, and so forth, under the coverage of FBS 160), FBS 160 may request SSs being served to report the respective signal strength measured for the DL signals (e.g. sync channel (preamble), BCH (e.g. IEEE 802.16m SFH), pilot, and such), of the FBS 160 and/or the signal strength difference from their minimum required signal strength. Based on the reported signal strengths, FBS 160 may reduce the Tx power to an extent, incrementally, such that each SS being served can still have a signal strength that meets the minimum required strength. In an embodiment, the minimum acceptable strength may be based on a certain QoS level. Each SS may have a different minimum required signal strength or acceptable strength.

After the power reduction, FBS 160 may request the non-member SS (e.g. SS 116) for which FBS 160 has performed IM, via some message (e.g. RNG-RSP or SCN-RSP), to measure whether it can find some accessible BS. The message may include an indicator to report signal measurements. If SS 116 still cannot access any accessible BS, SS 116 may send another scan report or send another request for IM so that the BS may perform additional IM (e.g. further Tx power reduction) if trigger conditions to request IM directly from inaccessible BS (or trigger conditions to request further IM directly from inaccessible BS) are met. At this point FBS 160 may consider the reported signal strengths and/or minimum required strengths of the member SSs to determine whether the policy allows further IM and to determine the amount the power reduction. In an embodiment, FBS 160 may provide another type of IM or change the type of IM, based on the policy.

As long as FBS 160 is allowing and performing IM, SS 116 may repeat the request for additional IM until Tx power cannot be reduced any further (i.e. because one of the member SSs being served has reached the minimum required/acceptable power). In an embodiment, FBS 160 may reduce the iterations by increasing the amount of power reduction (e.g. reduce Tx power such that one of the SSs being served by FBS 160 reaches the minimum required power).

When the policy does not allow FBS 160 to further reduce Tx power, FBS 160 may then attempt to negotiate Tx power with non-member SS accessible base stations (e.g. BS 103) via backhaul or via a Self-Organizing Network (SON) server. That is FBS 160 may send a request via backhaul (or SON server, BS controller, and such) by sending the Media Access Control identifier (MAC ID) of SS 116 and the scan report received from SS 116. The backhaul (or SON server or BS controller) may then try to reach some accessible BS (e.g. BS 103) that is near the SS 116 or the overlay BS of FBS 160, to raise its Tx power and attract SS 116 for handover. In an embodiment, FBS 160 may choose among SON, BS controller, gate way, or such, or via backhaul to some other BSs, to report or negotiate the power, according to the scan report from the SS 116. For example, FBS 160 may choose to negotiate with a BS (e.g. BS 103) that has the highest potential to serve the SS 116 or has the highest potential for handover.

In some embodiments, if the SS 116 still reports to FBS 160 that it cannot find any accessible BS, BS 160 may ask some of its member SSs being served to handover to another BS so FBS 160 can further reduce its Tx power. In an embodiment, FBS 160 may repeat iteratively with measurement reporting from SS 116 and member SSs (e.g. SS 117), until the SS 116 can find an accessible BS and associate with the accessible BS. Alternatively, FBS 160 may continue serving the member SSs that are currently being served and, instead, allow SS 116 to temporally access it with lower priority than its member SSs, as described in previous embodiments. After downlink control Tx power level is reduced, FBS 160 may also reduce the power level of the data channel by a similar amount. When SS 116 has handed over to another BS, FBS 160 may determine whether to partially reverse or terminate the IM measures based on scanning reports received from the member SSs that are being served, member SSs that were asked to hand out of FBS 160, and/or non-member SSs that are still benefitting from the IM.

Although the above embodiments were described with respect to reducing Tx power, the above processes (i.e negotiating with accessible BS that may be potentially attractive handover candidates for SS 116) may be performed with other types of IM.

FA Allocation Change

In some embodiments, the policy may allow the inaccessible BS (e.g. FBS 160) to change its frequency allocation (FA). That is, if the trigger conditions to initiate IM directly with an SS (or trigger conditions to initiate IM with a BS that is negotiating on behalf of an SS) are satisfied, FBS 160 can then try to choose a frequency allocation (FA) or frequency carrier that is different from the overlay BS (e.g. BS 103) or a nearby BS that is serving the non-member SS (e.g. SS 116). In an embodiment, SS 116 may report scanning results (e.g. via SCN-REP) on different FAs to FBS 160. Upon receiving the scanning report, FBS 160 may decide to select an FA (e.g. select an FA that is different from BS 103) or negotiate an FA via backhaul or SON server. FBS 160 (via backhaul), the SON server, SSs that are connected with BS 103 or other nearby BSs, and such others, may notify the nearby BSs about such change of FA, such the other BSs may also decide to change their FA accordingly.

When SS 116 hands over to another BS, the FA of FBS 160 may be changed back, if needed. For example, SS 116 may handover to an accessible BS (e.g. BS 103) by measuring the signal strength of FBS 160 and determining that trigger conditions to handover/connect to a BS are satisfied (e.g. the signal strength is below some threshold for a period of time longer than a threshold duration, whether the signal strength of FBS 160 is lower than the BS 103 by a threshold for a period of time longer than another threshold duration, and/or whether by location (such as GOS, location-based service, and such). Upon handing over to BS 103, SS 116 may let the network know (e.g. by reporting to BS 103) that it no longer needs IM from FBS 160. When the network notifies FBS 160 or the SON server, FA may be changed back (i.e. IM terminated), if necessary. In some embodiments, the change in FA may be reflected in the timeline illustrated in FIG. 10.

Fractional Frequency Reuse (FFR)

In some embodiments, the policy may allow an inaccessible BS (e.g. FBS 160), when performing IM, to conduct FFR. That is, if the trigger conditions to perform FFR are satisfied, FBS 160 may then try to select and use a frequency partition to mitigate the interference. The trigger conditions to perform FFR may be the same or similar to trigger conditions initiate IM directly with an SS (or trigger conditions to initiate IM with a BS that is negotiating on behalf of an SS), as discussed in earlier embodiments, as well as additional conditions. For example, the trigger conditions to perform FFR may require that FBS 160 is currently located in a sector of an overlay BS that uses a frequency partition or that a portion of its coverage area overlaps with a sector of at least one neighboring BS.

In an embodiment, FBS 160 may scan for the downlink control channel of the nearby BSs. FBS 160 may scan the Superframe Headers (SFHs) of the nearby BSs, get the SFHs from backhaul, and/or get the SFHs from an SS (e.g. SS 116 or SS 117) that can forward SFHs of other BSs to FBS 160 to determine the FFR information. FBS 160 may also measure the signal strengths and/or the interference levels of the frequency partitions. In an embodiment, member SSs that are currently being served by FBS 160 can also measure and report the signal strengths and/or the interference levels of the frequency partitions. Based the measured and reported information regarding the frequency partitions of nearby BSs, and/or the information of FFR from SFH, and/or the location information of the base stations, FBS 160 or the SON server can decide which frequency partition to use for IM. For example, if FBS 160 knows that it is overlaid by another BS (e.g. BS 103) and is in the sector which uses a particular frequency partition, FBS 160 may choose from among the other unused frequency partitions to avoid the interference with BS 103. FBS 160 can then further pick up a frequency partition which has less interference level among the frequency partitions not used by the overlay macro. Alternatively, FBS 160 may know or determine its neighboring BSs and their respective FFR settings; accordingly, FBS 160 may pick up a frequency partition which the neighbors are not using, if any.

IM for Inaccessible BS in Low Duty Mode (LDM)

In some embodiments, an inaccessible BS (e.g. FBS 160) may be able to perform IM for a requesting non-member SS (e.g. SS 116) while in low duty mode (LDM). In an embodiment, an inaccessible BS, while in LDM, may or may not broadcast an indicator of its LDM status. If the indicator of LDM status is broadcasted, the difference for LDM compared with the regular mode will be that the non-member SS may decode the indicator from BCH and know the BS is in LDM. The non-member SS may then use the LDM pattern information (e.g. probably cached information or pre-provisioned information) to measure the available interval (AI) if not all the signals exist during the unavailable interval (UAI) (e.g., sync channel or BCH or pilot, etc.) to measure.

In an embodiment, and with reference to FIG. 1, a non-member SS (e.g. SS 116) that is idle (i.e. not connected to any BS) may scan for an accessible BS (e.g. BS 103) during the UAI of the LDM of an inaccessible BS (e.g. FBS 160) and try to access and associate with the accessible BS. If SS 116 scans the AI of FBS 160 in LDM and measures that the signal strength is higher than a certain threshold, SS 116 should report to BS 103 (or the serving BS) regarding the interference from the AI of the LDM of FBS 160. BS 103 can negotiate with FBS 160 regarding the Tx power on the DL control channel of FBS 160. For example, BS 103 may ask FBS 160 in LDM to reduce Tx power on its DL control channel. FBS 160 may reduce its downlink control channel power such that the signal strength received by its member SSs (e.g. SS 117) is no less than the minimum required power. If FBS 160 does not want to hand out any of its members that are in idle mode or sleep mode (so it does not want to further reduce downlink power) but SS 116 still measures interference that is higher than a threshold during the AI of LDM of FBS 160, FBS 160 may allow SS 116 to access, as an exceptional case if policy permits, and FBS 160 may even wake up or exit from the LDM when SS 116 becomes active.

IM when an SS is Connected to a Serving BS

Figure 11:
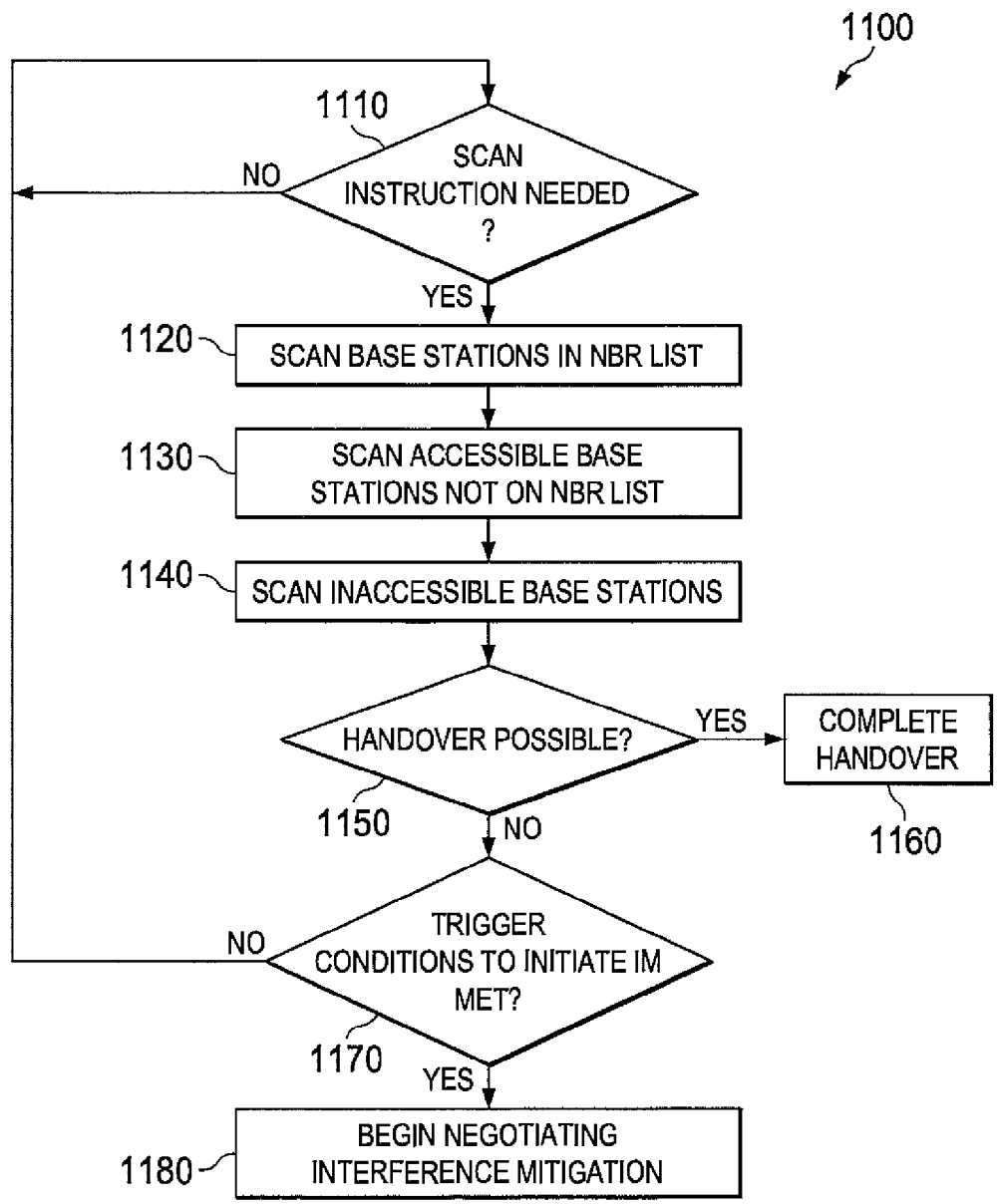
FIG. 11 illustrates a process for determining whether to initiate interference mitigation (IM) negotiations with an interfering BS when the SS is connected to a serving BS, according to an embodiment of the present disclosure.

FIG. 11 illustrates a process for determining whether to initiate interference mitigation (IM) negotiations with an interfering BS when the SS is connected to a serving BS, according to an embodiment of the present disclosure. When SS 116 encounters interference caused by FBS 160 while still connected to BS 103, assuming trigger conditions for IM are satisfied, BS 103 initiates IM with FBS 160 on behalf of SS 116. In some embodiments, process 1100 may be coordinated by BTS controller 225 of BS 103 to instruct the SS 116 to scan for candidate BSs for handover and interfering BSs for IM. In other embodiments, process 1100 may be coordinated by main processor 440 of SS 116, which autonomously scans candidate BSs for handover and interfering BSs for IM. Process 1100 is described with reference to BS 103 as the serving BS and FBS 160 as the interfering BS. However, this is only for illustrative purposes, and as already noted, the serving BS and interfering BS may be replaced by any type of base station. The following paragraphs will first describe process 1100 with respect to embodiments in which BS 103 coordinates the scanning procedure for initiating IM.

In block 1110, BS 103 determines whether to instruct the SS to scan its neighboring BSs. In an embodiment, the BS 103 may make this determination based on a message, such as a scanning request (SCN-REQ). SS 116 may send SCN-REQ message when certain conditions are met. Conditions may include the BS 103 signal strength falling below a certain threshold level, the BS 103 signal strength being weaker than the signal strength of an interfering BS (e.g. FBS 160), or the FBS 160 signal strength reaching above a threshold level. Signal strength can be the measured from BS downlink signals (e.g., sync channel (preamble), BCH (e.g. IEEE 802.16m SFH), pilot, and such). The signal strength measurement may be an average or instant value based on one or more of Signal to Interference-plus-Noise Ratio (SINR), Carrier to Interference-plus-Noise Ratio (CINR), Carrier to Interference Ratio (CIR), Carrier to Noise Ratio (CNR), Received Signal Strength Indication (RSSI), and other similar measurements.

In block 1120, BS 103 instructs SS 116 to scan neighboring BSs in particular time slots. In an embodiment, the SCN-REQ from SS 116 requests BS 103 for instructions and time slots to scan candidate base stations for handover. BS 103 sends a scanning response (SCN-RSP) to SS 116 that includes base stations in neighbor (NBR) list. The NBR list identifies nearby base stations known to BS 103, including macrocell base stations. The NBR list may also include microcells, picocells, open femtocells, and such. The NBR list is broadcasted by the BS to SSs. SS 116 monitors base stations in NBR list in accordance with the SCN-RSP from BS 103.

In block 1130, BS 103 instructs SS 116 to scan accessible BSs (that are not in the broadcasted NBR list) in particular time slots. In an embodiment, BS 103 receives another SCN-REQ from SS 116. BS 103 sends a scanning response (SCN-RSP) to SS 116 that provides time slots in which SS 116 may scan the accessible BSs that were not included in the NBR list, such as CSG-Open base stations and CSG-Closed based stations for which SS 116 is a member. In FIG. 1, SS FBS 160 would be an accessible BS with respect to SS 117. SS 116 monitors the accessible BSs that were not in the NBR list in accordance with the SCN-RSP from BS 103. The base stations in the NBR list and the accessible base stations that are not on the NBR list make up the candidate BSs for handover. In some embodiments, blocks 1120 and 1130 may be combined such that SS 116 concurrently scans all accessible BSs. In some embodiments, BS 103 may also include, in the SCN-RSP sent to SS 116, trigger conditions to initiate scanning procedure for IM initiation.

In block 1140, inaccessible base stations (e.g. FBS 160) are instructed to the SS to monitor. In some embodiments, BS 103 may send a request, via a message (e.g. the SCN-RSP), to SS 116 to scan inaccessible BSs. In an embodiment, BS 103 may request SS 116 to monitor inaccessible BSs if some trigger conditions (i.e. trigger conditions to initiate scanning procedure for IM initiation) are satisfied. The trigger conditions to initiate scanning procedure for IM initiation may include, and are not limited to, the serving BS signal strength is lower than a threshold, every candidate BS for handover have a signal strength lower than some threshold, the inaccessible BS signal strength is stronger than a threshold, and such. All trigger conditions discussed in the present disclosure may also include a time duration component and may be encoded in a type-length-value (TLV) format when transmitted in messages. The TLV format will be discussed further below with respect to Tables 1 and 2. BS 103 may send the SCN-RSP in response to receiving a SCN-REQ to scan BSs not in the NBR list. Alternatively, BS 103 may request SS 116 to scan inaccessible BSs via an unsolicited message or SCN-RSP. In some embodiments, BS 103 may request SS 116 to scan inaccessible BSs upon determining that handover to accessible base stations is not possible.

When scanning BSs, SS 116 can scan the sync channel and get the signal strength of the sync channel, preambles (Cell IDs) and the associated signal strengths. To determine whether a CSG-Closed BS is accessible, SS 116 may scan some of the super frame headers (SFHs) (broadcast channels) according to the signal strength of the sync channel to check whether the BS is accessible by checking whether the BSID or CSGID is in the local white list 462 of SS 116.

In an embodiment, MS may monitor the inaccessible femto with strong signal strength. For example, the MS can scan the synchronization (sync) channel and get the signal strength of sync channel, preambles (cell IDs) and associated signal strength, then the MS may scan further some of the broadcast channels (e.g., super frame header (SFH)) according to the signal strength of the sync channel (e.g., pick up some of the BSs with the strongest, second strongest sync channels, then scan their broadcast channels), to check whether the BS is accessible by comparing BSID or CSGID with the ones in the MS whitelist which is the local list of all the subscribed BSs of the MS (for CSG-closed BS type, if BSID/CSGID in the whitelist, it means accessible; not in the whitelist, it means accessible). Or another example, the MS can scan the sync channel and get the signal strength of sync channel, associated with the cell IDs (preambles), pick up the first a few BSs with the strongest signal strength, then check with the whitelist to see whether the cell ID is in the whitelist, for CSG-closed BS type, if not in the whitelist, it means inaccessible, if in the whitelist, it may further decode the broadcast channel (BCH) to check further about whether the CSG ID or BSID is in the whitelist, for CSG-closed BS type, if in the whitelist, it means accessible, if not in the whitelist, it means inaccessible. Then the MS can figure out which BS is inaccessible and with strong signal strength. Or, if the serving BS provides the MS a list of the accessible neighbor list, then the MS can utilize this list to figure out the inaccessible BS, e.g., if the accessible neighbor list includes the information of cell ID of the accessible BS, then the MS can know that the BSs with the cell ID not in the set of cell IDs of the accessible BS in the list provided by the serving BS may be inaccessible, then the MS could pick up one or multiple from these possibly inaccessible BSs based on the cell ID, to further monitor them (e.g., may decode BCH, may monitor pilots, etc.).

In some embodiments, SS 116 may scan inaccessible BSs autonomously when the trigger conditions to initiate scanning procedure for IM initiation are met. In another embodiment, SS 116 may autonomously scan or monitor inaccessible BSs at any time, regardless of whether a trigger condition is received from BS 103. In yet another embodiment, blocks 1130 and 1140 may be performed concurrently. In another embodiment, blocks 1120, 1130, and 1140 can be combined in any order and some of them can be omitted.

In block 1150, BS 103 determines whether a handover is possible. That is, BS 103 receives a scanning report (e.g. SCN-REP or some other message), which may include the scanning results of the serving BS 103, accessible BSs, and inaccessible BSs, that were monitored by SS 116. The parameters of a scanning report, SCN-REP, will be described later in this disclosure with respect to Table 3. In an embodiment, BS 103 may request SS 116 to send the SCN-REP when some trigger conditions (i.e. trigger conditions to send scanning results for IM initiation). The trigger conditions to send scanning results for IM initiation may be defined by BS 103, encoded in the TLV format, and transmitted to SS 116 via SCN-RSP. In some embodiments, SS 116 may send a SCN-REP to BS 103 when the trigger conditions to send scanning results for IM initiation are met, regardless of whether SS 116 has received the request from BS 103. The trigger conditions to send scanning results for IM initiation can be, and are not limited to, the signal strength of the inaccessible BS is higher than the serving BS by a threshold, or the signal strength of the inaccessible BS is higher than some threshold. Based on the scanning results, BS 103 first determines whether SS 116 can handover to any accessible BS.

If, based on the scanning results, SS 116 can handover to an accessible BS, BS 103 selects the candidate BS for handover and initiates the handover procedure in block 1160.

If handover is not possible, BS 103 determines, based on the scanning results (e.g. SCN-REP), whether trigger conditions to initiate IM with an inaccessible BS are satisfied in block 1170. Trigger conditions to initiate IM may include, and are not limited to, the signal strength of the inaccessible BS is higher than the serving BS by a threshold or the signal strength of the inaccessible BS is higher than some threshold, and such. Trigger conditions may vary among base stations. In some embodiments, the trigger conditions to initiate IM may be defined by BS 103, encoded in SCN-RSP in the TLV format, and transmitted to SS 116. In the embodiments in which SS 116 knows the trigger conditions to initiate IM, SS 116 may determine whether the trigger conditions to initiate IM are satisfied and request the BS 103 to initiate IM. BS 103 may double check whether the trigger conditions to initiate IM are satisfied. In another embodiment in which SS 116 reports signal strengths of all accessible BSs separately and scans inaccessible BSs only after it is determined that handover to an accessible BS is not possible, the SCN-REP essentially represents a request to initiate IM. For example, an embodiment, block 1150 may be performed prior to block 1140.

If the trigger conditions to initiate IM are not met, BS 103 returns to block 1110 and requests SS 116 to scan BSs in the NBR list. In an embodiment, BS 103 may send a message informing SS 116 that the request to initiate IM is denied.

If the trigger conditions to initiate IM are satisfied, BS 103 or the network may initiate IM negotiations with the interfering inaccessible BS (e.g. FBS 160) via backhaul or network in block 1180. IM with FBS 160 may include, but is not limited to, static or semi-static resource reservation and resource sharing using frequency division multiplexing (FDM) or time-division multiplexing (TDM) and/or downlink (DL) power control. In an embodiment, if IM is initiated successfully via the backhaul or network BS 103 may signal SS 116 via a dedicated message (e.g. IM-INI) or using some fields of some messages. The signal may include the identification (e.g., BSID, Preamble_Index, FA, etc.) of the inaccessible BS with which IM has been initiated and a status bit set to '1'. IM-INI may include some further information on how IM is performed such as indication of categories and detailed IM adjustment including, for instance, category power control (e.g., it may include the dB value reduction), category resource reservation (e.g., it may include which resource is reserved), and so forth. The parameters of IM-INI will be described later in this disclosure with reference to Table 4.

With respect to embodiments in which SS 116 autonomously monitors accessible and inaccessible BSs, SS 116 may perform blocks 1120-1160 autonomously without receiving instruction from BS 103. In some embodiments, block 1110 may be omitted, such that SS 116 may monitor BSs periodically. Also, blocks 1120-1160 may be combined, such that SS 116 concurrently scans all accessible and inaccessible BSs. In block 1140, if SS 116 determines that handover to an accessible BS is possible, SS 116 may signal BS 103 and initiate handover to a candidate accessible BS in block 1150. If handover is not possible, SS 116 determines whether the trigger conditions to send scanning results for IM initiation are met in block 1160. If the trigger conditions to send scanning results for IM initiation are met, SS 116 requests BS 103 via SCN-REP or some other message (e.g. an IM Request message, IM-REQ) to initiate the IM negotiation process. If the trigger conditions are not satisfied, SS 116 returns to monitor BSs.

In essence, if an SS, which is a non-member of a CSG-Closed BS, measures that the downlink signal with a Received Signal Strength Indication (RSSI) or Carrier to Interference-plus-Noise Ratio (CINR) difference between its serving BS and the CSG-Closed BS is smaller than a threshold difference for a period of time greater than a threshold time duration, the SS may report it to the serving BS to trigger DL/UL interference mitigation, such as resource reservation, in the CSG-Closed BS.

Process 1100 reflects an embodiment of the current invention in which interference mitigation (IM) (e.g., Semi-static/dynamic IM and such) has lower priority than handover (HO). For example, IM should be triggered only if HO cannot be performed, and the interference from inaccessible BS (e.g., unsubscribed CSG femto, access-barred BS, etc.) meets the trigger conditions for IM initiation. However, this is not meant to limit the scope of the present disclosure, and the blocks may be performed in a different sequence as the priority of handover and IM changes. For example, in some embodiments, BS 103 trigger conditions to initiate IM may only require that handover is not possible. In some embodiments, IM may be performed independently from handover, which means IM could be earlier than handover, concurrently with handover, or later than handover.

The embodiments described above apply when SS 116 is connected to BS 103. When SS 116 is connected is connected to BS 103, BS 103 negotiates IM parameters with FBS 160 on behalf of SS 116. IM parameters may include, and are not limited to, the type/category of IM, duration of the IM, trigger conditions for terminating/adjusting IM, and such.

In some embodiments, SS 116 may perform any portion of process 1100 autonomously when SS 116 is not presently served by BS 103 and cannot connect to any other BS. Such situations may arise when SS 116 loses connection to BS 103 while in a coverage hole due to strong interference caused by FBS 160. In some embodiments any or all trigger conditions related to interference management may be. In an embodiment, SS 116 may send a request directly to FBS 160 under certain trigger conditions (trigger conditions to indicate coverage hole). This situation is discussed further with respect to FIG. 5.

Figure 12:
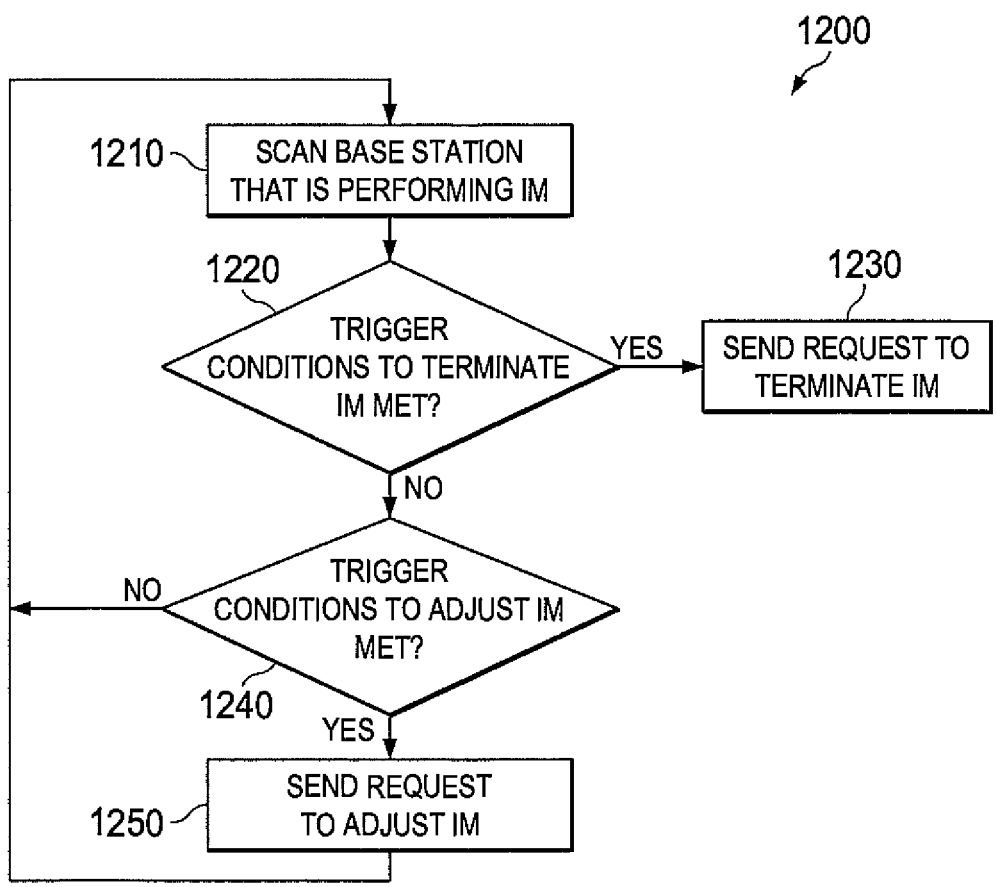
FIG. 12 illustrates a process for determining whether to terminate or adjust interference mitigation (IM) with an interfering BS when the SS is connected to a serving BS, according to an embodiment of the present disclosure.

FIG. 12 illustrates a process for determining whether to terminate or adjust interference mitigation (IM) with an interfering BS when the SS is connected to a serving BS, according to an embodiment of the present disclosure. When a serving BS (e.g. BS 103) knows that IM is coordinated and performed with an interfering BS (e.g. FBS 160), the serving BS coordinates a scanning procedure with SS 116 to determine whether to terminate or adjust (e.g. renegotiate) IM with FBS 160. In some embodiments, process 1200 may be coordinated by BTS controller 225 of BS 103 to monitor FBS 160 and determine when to terminate IM. In other embodiments, process 1200 may be coordinated by main processor 440 of SS 116, which autonomously scans FBS 160 and determines when to request IM termination. Process 1200 is described with reference to BS 103 as the serving BS and FBS 160 as the interfering BS. However, this is only for illustrative purposes, and as already noted, the serving BS and interfering BS may be replaced by any type of base station. The following paragraphs will first describe process 1200 with respect to embodiments in which BS 103 coordinates the scanning procedure for IM termination.

In block 1210, BS 103 may request SS 116 to scan FBS 160 via a message (e.g. SCN-RSP). In some embodiments BS 103 requests SS 116 to scan and report the signal strength of the interfering BS with which IM was coordinated (e.g. FBS 160) if some trigger conditions (trigger conditions to initiate scanning procedure for IM termination) are satisfied. The trigger conditions to initiate scanning procedure for IM termination may include, and are not limited to, the signal strength of the FBS 160 is lower than BS 103 by a threshold, or the signal strength of FBS 160 is lower than some threshold, and such. The trigger conditions to initiate scanning procedure for IM termination may be based on the attributes of the IM negotiated between BS 103 and FBS 160. As such, the trigger conditions to initiate scanning procedure for IM termination may vary for each IM instance. In an embodiment, BS 103 may receive a SCN-REQ to scan FBS 160 when the trigger conditions to initiate scanning procedure for IM termination are met, and BS 103 may send the SCN-RSP to SS 116 in response to receiving the SCN-REQ to scan FBS 160. Alternatively, BS 103 may request SS 116 to scan inaccessible BSs via an unsolicited message or SCN-RSP. The trigger conditions to initiate scanning procedure for IM termination may be encoded in the TLV format and included in the SCN-RSP.

SS 116 scans FBS 160 based on the trigger conditions to initiate scanning procedure for IM termination and reports the scanning results to BS 103 in a message (e.g. SCN-REP). In an embodiment, SCN-REP may be sent periodically. In another embodiment, SS 116 sends the scanning report under a separate set of trigger conditions (trigger conditions to send scanning results for IM termination). The trigger conditions to send scanning results for IM termination may also be defined in SS 116.

In an embodiment, SS 116 may send a SCN-REP to BS 103 when the trigger conditions to send scanning results for IM termination are met, regardless of whether SS 116 has received the request from BS 103. Alternatively, the trigger conditions to send scanning results for IM termination may be defined by BS 103, encoded in the TLV format, and transmitted to SS 116 via the SCN-RSP, along with the trigger conditions to initiate scanning procedure for IM termination. The trigger conditions to send scanning results for IM termination may include, and are not limited to, measured value in some measurement metric (e.g., the signal strength, etc.) of FBS 160 is lower than BS 103 by a threshold, or the signal strength of FBS 160 is lower than some threshold, and such. The trigger conditions to send scanning results for IM termination may be based on attributes of the IM negotiated between BS 103 and FBS 160. As such, the trigger conditions to send scanning results for IM termination may vary for each IM instance.

In block 1220, BS 103 determines whether to terminate IM based on the scanning results in SCN-REP. That is, BS 103 determines whether to terminate IM depending on whether certain trigger conditions (trigger conditions to terminate IM) are met. The trigger conditions to terminate IM may include, and are not limited to, measured value in some measurement metric (e.g., the signal strength, etc.) of FBS 160 is lower than BS 103 by a threshold, or the signal strength of FBS 160 is lower than some threshold, a time duration, and such. The trigger conditions to terminate IM may be based on attributes of the IM negotiated between BS 103 and FBS 160 or directly negotiated between BS 103 and FBS 160. As such, the trigger conditions to terminate IM may vary for each IM instance.

If the trigger conditions to terminate IM are met, BS 103 or the network can terminate IM with FBS 160 via backhaul or network in block 1230. It is noted that the trigger conditions to terminate IM or adjust IM may be defined to minimize the ping-pong effect of terminating IM and initiating IM frequently. For example, the every trigger condition may include a time duration component, or the thresholds may be flexible or adjusted. If IM is terminated, BS 103 may notify SS 116 by sending a message or signal. In an embodiment, BS 103 may reuse the message for IM initiation (e.g. IM-INI) as the message for IM termination. IM-INI may include the identification (e.g., BSID, Preamble_Index, FA, etc.) of the inaccessible BS with which IM has been terminated and a status bit set to '0'. Alternatively, BS 103 may use a new message. The content of IM termination message may be similar to the IM initiation message.

If the trigger conditions to terminate IM are not satisfied, BS 103 may determine whether to adjust (e.g. reverse or renegotiate) IM with FBS 160 based on the scanning results. In some embodiments, BS 103 may make this determination based on one or a combination of trigger conditions (trigger conditions to adjust IM). The decision of whether and how to adjust IM can be based on multiple reports from multiple SSs in a period of time. Such period of time may be adjustable based on different situations at BS 103. For example, if SS 116 reports that interference is weak at time 1, but another SS (not shown in FIG. 1) does not report anything (which can mean that the interference or the signal strength from the interfering BS is not weak enough), BS 103 may decide to adjust IM. In an alternative embodiment in which IM adjustment is not available, if trigger conditions for IM termination are not met, blocks 1240 and 1250 are omitted, and BS 103 can return to block 1210 and request SS 116 to scan FBS 160.

Trigger conditions to adjust IM may include, and is not limited to, measured value in some measurement metric (e.g., the signal strength, etc.) of FBS 160 is lower than BS 103 by a threshold, the signal strength of FBS 160 is lower than some threshold, SS 116 is moving away from FBS 160, SS 116 connection status has changed, a negotiated IM duration has expired, an accessible base station is available for handover, and so forth. The trigger conditions to adjust IM may be based on attributes of the IM negotiated between BS 103 and FBS 160 or directly negotiated between BS 103 and FBS 160. As such, the trigger conditions to terminate IM may vary for each IM instance.

If trigger conditions to adjust IM are not met, BS 103 may return to block 1210 and request SS 116 to scan FBS 160.

If trigger conditions to adjust IM are satisfied, BS 103 performs IM adjustment in block 1250. That is, BS 103 determines how to adjust IM and renegotiates with FBS 160 on behalf of SS 116. Some options for IM adjustments will be described further below.

After IM adjustments have been made, BS 103 sends a notification to SS 116 via a message, such as an unsolicited scanning response (SCN-RSP) or an IM initiation message (IM-INI) and returns to block 1210. The contents of IM-INI may be the same or analogous to successful IM initiation. In some embodiments, the BS 103 may also request SS 116 to monitor FBS 160 under some trigger conditions (e.g. trigger conditions to initiate scanning procedure for IM termination, trigger conditions to send scanning results for IM termination, and such). The trigger conditions may be encoded in TLV format and included in the SCN-RSP. In some embodiments, BS 103 may send the SCN-RSP after sending the IM-INI.

With respect to embodiments in which SS 116 autonomously monitors FBS 160, SS 116 may autonomously scan FBS 160 and determine when to request BS 103 to terminate IM. In essence, if SS 116, which is a non-member of a CSG-Closed FBS 160 measures that the downlink signal with a Received Signal Strength Indication (RSSI) or Carrier to Interference-plus-Noise Ratio (CINR) difference between its serving BS 103 and the FBS 160 is larger than a threshold amount for a period of time greater than a threshold duration, SS 116 may report it to the BS 103 to trigger the release of the reserved resource on DL/UL in FBS 160.

For example, in block 1210, SS 116 may autonomously scan FBS 160 periodically. In another embodiment, SS 116 may scan FBS 160 based on the trigger conditions to initiate scanning procedure for IM termination. SS 116 may also send the scanning report to BS 103 periodically or under trigger conditions to send scanning results for IM termination. In an embodiment, trigger conditions to terminate IM may also be defined in SS 116. As such, SS 116 may also perform block 1220 and determine whether trigger conditions to terminate IM are satisfied. Similarly, SS 116 may also perform block 1240 to determine whether IM may be adjusted if trigger conditions to adjust IM are also be defined in SS 116.

In fact, any or all applicable trigger conditions related to IM (i.e. trigger conditions to initiate scanning procedure for IM initiation/termination, send scanning results for IM initiation/termination, initiate/terminate IM, adjust IM, and such) may be defined in SS 116. In embodiments in which SS 116 knows at least one of the trigger conditions to terminate IM and the trigger conditions to adjust IM, SS 116 may indicate the trigger conditions that were met in the scanning report sent to BS 103. Based on the scanning report, BS 103 will terminate or adjust IM. Alternatively, BS 103 may also confirm that the trigger conditions were met in blocks 1220 and 1240.

Figure 13:
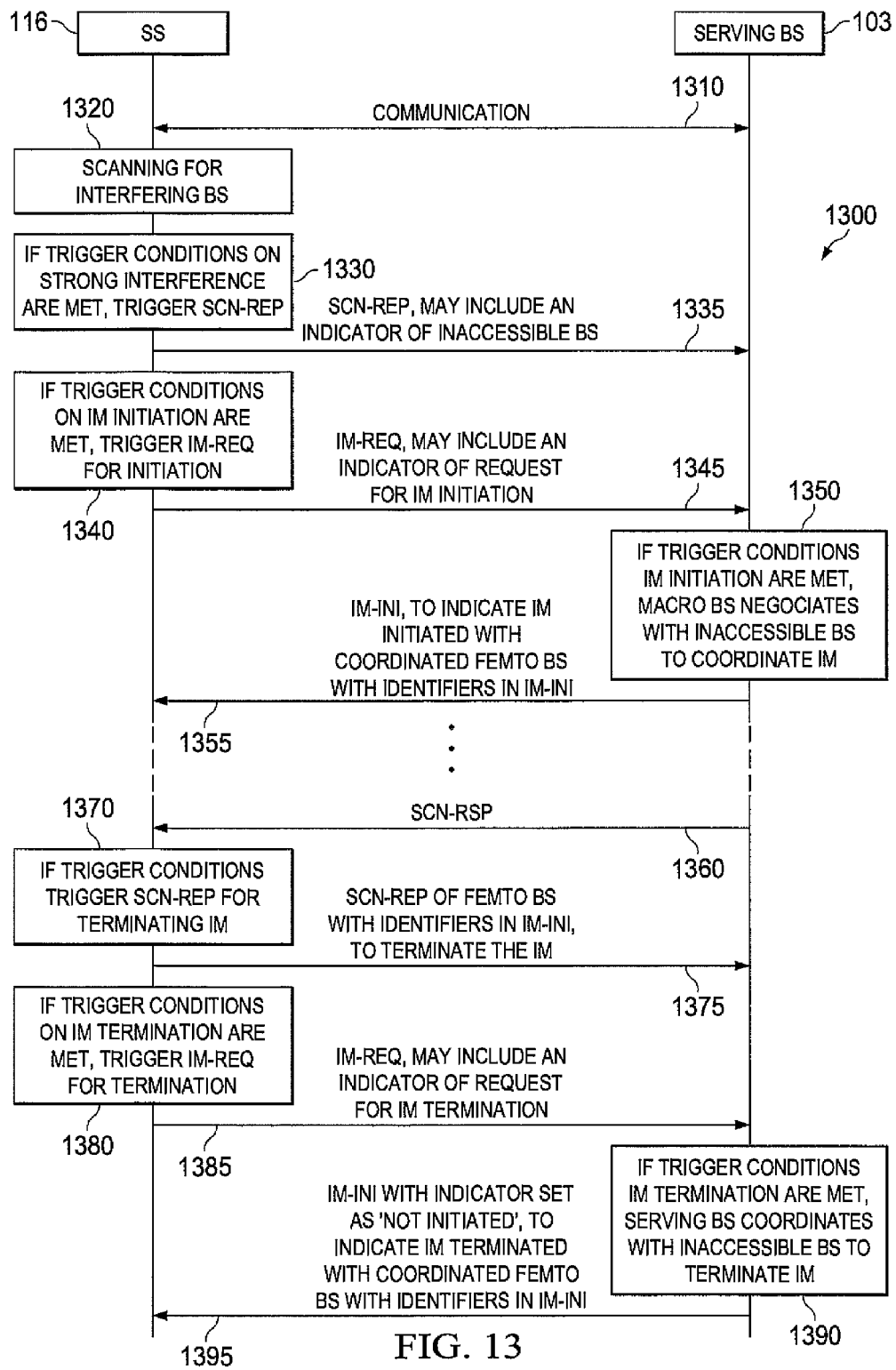
FIG. 13 illustrates a high-level signal flow that is representative of communications between an SS and its serving BS, when the serving BS requests IM initiation and IM termination on behalf of the SS, according to some embodiments of the present disclosure.

FIG. 13 illustrates an exemplary signal flow that is representative of communications between an SS and its serving BS to request IM initiation and IM termination, according to some embodiments of the present disclosure. Signal flow 1300 reflects some embodiments discussed with respect to processes 1100 and 1200.

Initially, an SS (e.g. SS 116) and its serving BS (e.g. BS 103) perform communications 1310. While connected to BS 103, SS 116 may scan for an interfering BS in block 1320 when trigger conditions to initiate scanning procedure for IM initiation are met. As discussed with reference to process 1100, an SS may scan for an interfering BS autonomously (when the trigger conditions to initiate scanning procedure for IM initiation are defined in SS 116 or received from BS 103) or by request (e.g. via SCN-RSP) from BS 103. When trigger conditions to send scanning report for IM initiation are met, SS 116 may generate a scanning report (SCN-REP) in block 1330. The scanning report may include cell IDs, signal strengths, BS type (e.g., accessible BSs and CSG-Closed BSs to which SS 116 is not a member), and/or BSIDs of scanned base stations. SS 116 may include every scanned BS or limit the number of BSs included in the scanning report. Then SS 116 may send the SCN-REP 1335 to BS 103 with an indication of an inaccessible BS (or CSG-Closed BS to which SS 116 is not a member).

In embodiments in which the trigger conditions for IM initiation are defined in SS 116, SS 116 may also determine whether trigger conditions to initiate IM are satisfied in block 1340. If the trigger conditions to initiate IM are satisfied, SS 116 may send a request to initiate IM 1345 (IM-REQ with an indication to request for IM initiation) to BS 103. The signal for IM request to initiate IM (or terminate IM) can include the cell ID, FA, BSID, and such, of the interfering BS and neighboring BSs and some measurement report of the interfering BS, serving BS, neighboring BSs. The signal should also include an indicator for the purpose, such as IM initiation, termination, and such.

In block 1350, BS 103 determines whether trigger conditions for IM initiation are satisfied. As already mentioned, in some embodiments, BS 103 may determine whether the trigger conditions for IM initiation are satisfied based on the SCN-REP received from the SS. In embodiments in which trigger conditions for IM initiation are defined in SS 116 or were previously sent to SS 116, the receiving SCN-REP with indication of inaccessible BS or an IM-REQ may be sufficient for BS 103. Upon determining that the trigger conditions for IM initiation are satisfied, BS 103 begins negotiating with the inaccessible BS (e.g. CSG-Closed FBS 160) to initiate a coordinated IM (i.e. IM in which a serving BS negotiates with another BS for interference management on behalf of an SS). The negotiations may be communicated through the backhaul. BS 103 may then signal SS 116 (e.g. via the IM-INI message 1355) to indicate whether the coordinated IM has been successfully initiated with FBS 160. As will be discussed later, IM-INI 1355 may include information on whether IM was successfully initiated (or failed), the type of IM coordinated, the BSID of the inaccessible BS (e.g. FBS 160) with which BS 103 has coordinated IM, and/or other IM details.

In an embodiment in which the serving BS (e.g. BS 103) knows that IM has been coordinated and performed with an interfering BS (e.g. FBS 160), BS 103 may request SS 116 (e.g. via an unsolicited SCN-RSP 1360) to scan and report FBS 160 (or any interfering BS that is performing IM) either periodically or under some trigger conditions. For example, BS 103 may instruct SS 116 to scan FBS 160 periodically and send a scanning report when trigger conditions to send scanning report for IM termination are satisfied.

In block 1370, SS 116 determines whether trigger conditions to send scanning report for IM termination are met. If the conditions to send scanning report for IM termination are satisfied, SS 116 sends the SCN-REP 1375 to BS 103. SCN-REP 1375 may include the BSID of FBS 160. In embodiments in which SS 116 scans autonomously, the SCN-REP 1375 will include the BSID that was included in the IM-INI 1355 received from when the coordinated IM was initiated.

In embodiments in which the trigger conditions for IM termination are defined in SS 116, SS 116 may also determine whether trigger conditions to terminate IM are satisfied in block 1380. If the trigger conditions to terminate IM are satisfied, SS 116 may send a request to terminate IM 1385 (IM-REQ with an indication to request for IM termination) to BS 103. The signal for IM request to terminate IM can include information as discussed with regard to the request to initiate IM 1345.

In block 1390, BS 103 may coordinate with FBS 160 to terminate IM when the trigger conditions for IM termination are met based on the SCN-REP or IM-REQ, depending on whether the trigger conditions for IM termination are defined in SS 116 or were previously communicated to SS 116. BS 103 may then signal SS 116 (e.g. via the IM-INI message 1395) to indicate whether the IM has been successfully terminated in FBS 160. In an embodiment, BS 103 may send an IM-TMT message (instead of an IM-INI message with an initiation/termination indicator).

IM Termination and Adjustment when Serving BS Negotiates with Interfering BS

Some options for IM adjustments negotiated between a serving BS (e.g. BS 103) and the interfering BS with which IM has been initiated (e.g. FBS 160) will now be described. As already discussed, when IM is successfully initiated, adjusted, or terminated, BS 103 may then send the IM-INI to notify SS 116 of the IM status. BS 103 may then also send an unsolicited SCN-RSP to instruct SS 116 to scan and report periodically or under respective trigger conditions, or SS 116 may autonomously scan and report accordingly. The trigger conditions to send scanning results for IM termination may be based on the trigger conditions to adjust IM. When trigger conditions to terminate or adjust IM are met, BS 103 may have at least one of the following options at its disposal to terminate or adjust IM. The type of IM termination or adjustment may depend on the type of IM that was initially negotiated between BS 103 and FBS 160, trigger conditions to adjust IM, and such.

It is noted that while the serving BS (e.g. BS 103) may have its own trigger conditions to initiate, terminate, and adjust IM, IM initiation, termination, and adjustment are all negotiated with the interfering BS (e.g. FBS 160). IM is ultimately performed in FBS 160, which may have its own set of trigger conditions to initiate, terminate, and adjust IM. This is because FBS is primarily serving members (e.g. SS 117) of its closed CSG. In addition, FBS 160 may be receiving IM requests from not only BS 103, but another serving BS that is negotiating on behalf of an SS other than SS 116. As such, FBS 160 may decide to adjust IM although BS 103 is requesting IM termination.

In an embodiment, SS 116 may begin to monitor FBS 160 and scanning results to BS 103 after a certain time T. When trigger conditions to adjust IM are met BS 103 may request FBS 160 to terminate or adjust IM. For example, if FBS had initiated IM by reducing its transmission power the and the scanning results now indicate that the signal strength of FBS 160 is lower than a threshold, BS 103 may inform FBS 160 that FBS 160 may raise its Tx power back to normal or by another amount. Alternatively, if the signal strength of FBS 160 is higher than a threshold, BS 103 may request FBS 160 to further reduce its Tx power. FBS 160 will then decide whether to raise its Tx power based on the status. The time T can be adjustable based on various parameters, such as the type of IM initiated, SS traffic type, and so forth. In one example, IM is initiated using Tx power reduction as the initial IM solution; however, the IM solution is not so limited and may be one or a combination of fractional frequency reuse (FFR), resource reservation, carrier change, beam forming, and so forth. Furthermore, IM termination and adjustment do not have to coincide with the initiated IM solution and may also be one or a combination of IM solutions.

Figure 14:
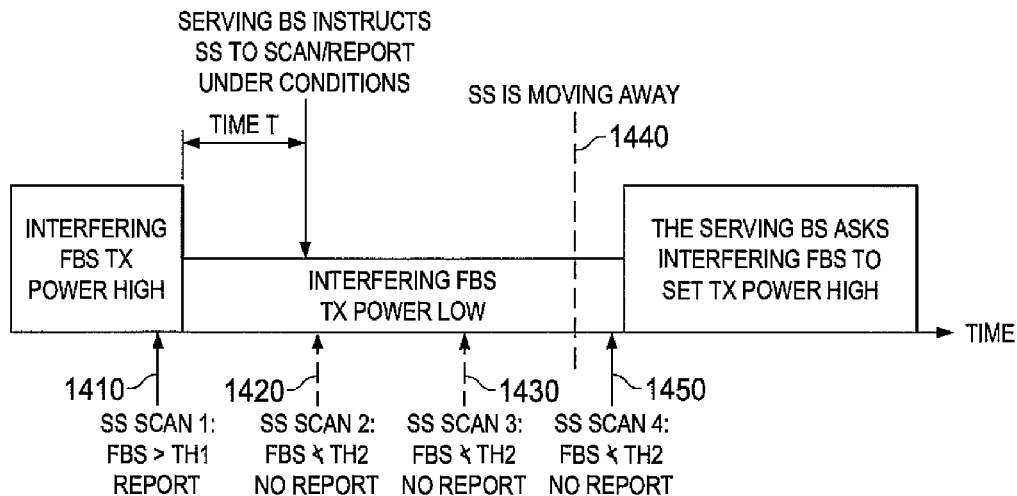
FIG. 14 illustrates a timeline for when an SS reports scanning results to a serving BS during IM based on trigger conditions, according to an embodiment of the present disclosure.

FIG. 14 illustrates a time line for when an SS reports scanning results to a serving BS during IM based on trigger conditions, according to an embodiment of the present disclosure. FIG. 14 assumes that the conditions to send scanning results for IM initiation require that a signal strength of the interfering BS is greater than a threshold. However, this is only to simplify the description of the timeline and does not limit the scope of the present disclosure. Initially, an SS (e.g. SS 116) encounters interference caused by an interfering BS (e.g. FBS 160) while connected to a serving BS (e.g. BS 103). At time 1410, an SS (e.g. SS 116) performs a scan and determines that the signal strength of the interfering BS (e.g. FBS 160) is greater than a first threshold Th1. That is, the conditions to send scanning results for IM initiation are satisfied. As such, SS 116 reports FBS 160 to its serving BS (e.g. BS 103). It is assumed that BS 103 has determined that the trigger conditions to request IM initiation are satisfied and negotiates IM initiation with FBS 160 on behalf of SS 116, resulting in FBS 160 reducing its Tx power.

After a time duration T following successful IM initiation, BS 103 instructs SS 116 to monitor FBS 160 periodically and report the scanning results when the signal strength of the FBS 160 is lower than a second threshold Th2 (i.e. conditions to send scanning report for IM termination). The conditions may be included in the instruction to scan (e.g. an unsolicited SCN-RSP). Accordingly, SS 116 scans FBS 160 periodically at time 1420, time 1430, and time 1450. At time 1420 and time 1430, SS 116 does not report the scanning results because the signal strength of FBS 160 is lower than the second threshold Th2. However, at time 1440 (between time 1430 and time 1450), SS moves away from FBS 160, causing the measured signal strength of FBS 160 to decrease.

At time 1450, the signal strength of FBS 160 falls below the second threshold Th2, triggering SS 116 to send a scanning report to BS 103. Upon receiving the scanning report, BS 103 determines that the conditions to request IM termination are satisfied and requests FBS 160 to reverse IM. Although FIG. 14 has been described with respect to IM initiation and IM termination, the same may also apply for IM adjustment (for increasing or decreasing Tx power).

In an embodiment, Time T may subsequently be adjusted based on the results of the IM adjustment negotiations. For example, based on the report or the result of IM termination or adjustment negotiations, FBS 160 may be monitored after time duration T2, T3, and so forth. BS 103 collects the reports and decides when to inform or coordinate with FBS 160 to terminate or adjust IM. T, T1, T2, and so forth, can also be adjustable based on reports from multiple SSs, movement of SS 116, traffic type of SS 116, and such. For example, when SS 116 is moving fast, time can be shortened.

Figure 15:
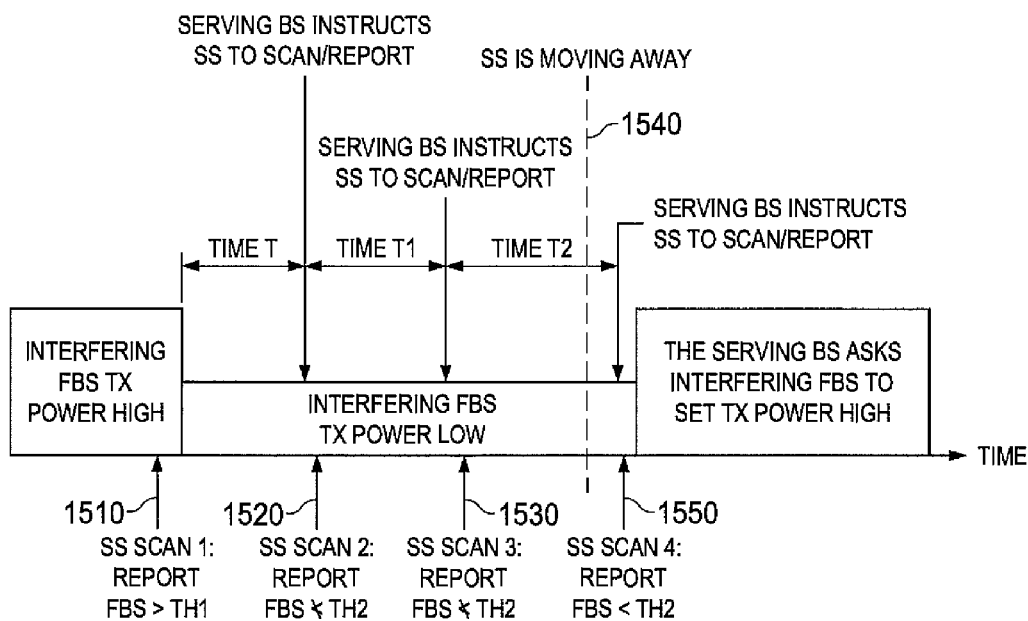
FIG. 15 illustrates a timeline for when an SS reports scanning results to a serving BS during IM based on instructions from the serving BS, according to an embodiment of the present disclosure.

FIG. 15 illustrates a timeline for when an SS reports scanning results to a serving BS during IM based on instructions from the serving BS, according to an embodiment of the present disclosure. FIG. 15 will be described using the same starting scenario and assumptions as FIG. 14. At time 1510, SS 116 determines that the signal strength of the interfering BS (e.g. FBS 160) is greater than a first threshold Th1 and sends a scanning report to its serving BS (e.g. BS 103). BS 103 negotiates with FBS 160 to reduce its Tx power.

After a time duration T following successful IM initiation, BS 103 instructs SS 116 to scan FBS 160 and send a scanning report. Based on the scanning report (SS Scan 2) received at time 1520 which indicates that trigger conditions to request IM termination have not been satisfied, BS 103 waits for a time T1 before instructing SS 116 to scan FBS 160 and send another scanning report. Based on the scanning report (SS Scan 3) received at time 1530 which indicates that trigger conditions to request IM termination have not been satisfied, BS 103 waits for a time T2 before instructing SS 116 to scan FBS 160 and send another scanning report.

Meanwhile SS 116 moves away from FBS 160 at time 1540. Consequently, at time 1550, BS 103 determines that the trigger conditions to request IM termination are satisfied. That is, the signal strength of FBS 160 is lower than a second threshold Th2. Accordingly, BS 103 requests FBS 160 to reverse IM (i.e. terminate IM). Although FIG. 15 has been described with respect to IM initiation and IM termination, the same may also apply for IM adjustment (for increasing or decreasing Tx power).

In an embodiment, an IM timer may be set at FBS 160. When the IM timer expires, FBS 160 may return to normal state. If more than one type of IM solution has been initiated, the IM timer may be associated with one, several, or all IM solutions initiated at FBS 160. In some embodiments, the IM timer may be set on a per SS basis or common for all SSs. The IM timer may be a negotiated value via the network or predefined in FBS 160.

Figure 16:
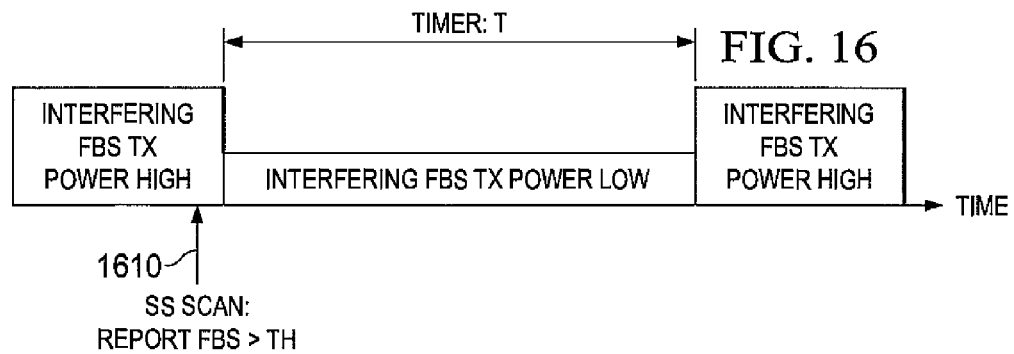
FIG. 16 illustrates a timeline for when an interfering BS reverses IM based on an IM timer, according to an embodiment of the present disclosure.

FIG. 16 illustrates a timeline for when an interfering BS reverses IM based on an IM timer, according to an embodiment of the present disclosure. FIG. 16 will be described using the same starting scenario and assumptions as FIG. 14. At time 1610, SS 116 determines that the signal strength of the interfering BS (e.g. FBS 160) is greater than a threshold Th and sends a scanning report to its serving BS (e.g. BS 103). BS 103 negotiates with FBS 160 to reduce its Tx power. In addition, FBS 160 sets a timer to a time duration T and begins counting down. When timer T expires, FBS 160 reverses (i.e. terminates) IM and raises its Tx power to its original level or another higher level. Although timer of FIG. 15 has been described with respect to IM initiation, the same may also apply for IM adjustment (for increasing or decreasing Tx power).

In some embodiments, the IM timer can be a fixed or flexible value. The timer can be negotiated value via the network. If the scheduling cycle or interval is known by BS 103, then BS 103 may inform FBS 160 to adjust the timer based on the scheduling interval. In addition, any of the trigger conditions described may be based on the IM timer. In some embodiments, the IM timer value at each subsequent IM initiation and adjustment may be increased in a multiplicative or additive manner. The IM timer may also be adjusted based on the type of IM solution used, the distance between SS 116 and FBS 160, and/or the velocity of SS 116. For example, IM timers applied to IM solutions that are very dynamic in nature, such as resource release/block or Tx power increase/decrease, may have a shorter durations. In contrast IM timers for IM solutions which do not change frequently in status (e.g., FFR, frequency allocation (FA) change, switching between CSG-Closed to CSG-Open, and such) may have longer durations. This also applies time durations for monitoring FBS 160.

Figure 17:
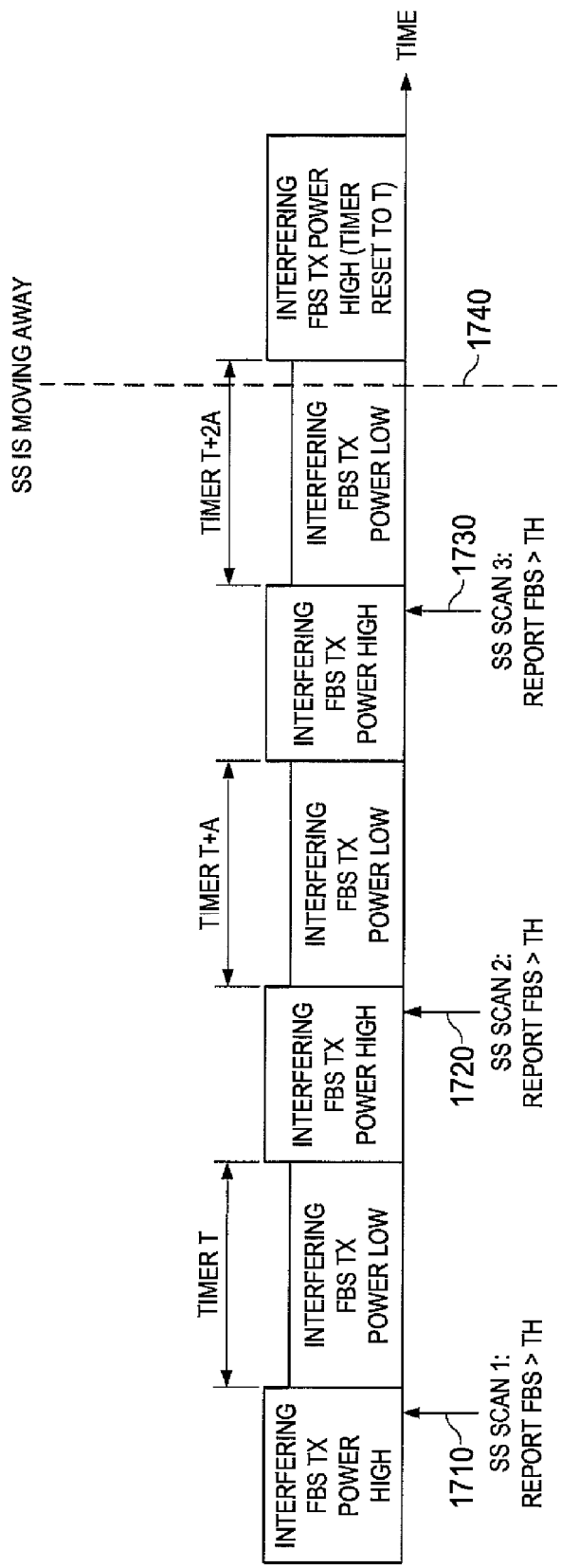
FIG. 17 illustrates a timeline for when an interfering BS reverses IM based on an adjustable timer, according to an embodiment of the present disclosure.

FIG. 17 illustrates a timeline for when an interfering BS reverses IM based on an adjustable timer, according to an embodiment of the present disclosure. FIG. 17 will be described using the same starting scenario and assumptions as FIG. 14. At time 1710, SS 116 determines that the signal strength of the interfering BS (e.g. FBS 160) is greater than a first threshold Th1 and sends a scanning report to its serving BS (e.g. BS 103). BS 103 negotiates with FBS 160 to reduce its Tx power. In addition, FBS 160 sets an adjustable timer to a time duration t and begins counting down. When the adjustable timer expires, FBS 160 reverses (i.e. terminates) IM and raises its Tx power to its original level or another higher level.

At time 1720, SS 116 determines that the signal strength of the interfering BS (e.g. FBS 160) is greater than the threshold Th and sends a scanning report to its serving BS (e.g. BS 103). BS 103 negotiates with FBS 160 again to reduce its Tx power. FBS 160 determines that the negotiation to initiate IM is based on a consecutive request from SS 116 and decides to set the adjustable timer to time duration t+a, where a is some constant value, and begins counting down. When the adjustable timer expires, FBS 160 reverses (i.e. terminates) IM and raises its Tx power to its original level or another higher level.

At time 1730, SS 116 again determines that the signal strength of the interfering BS (e.g. FBS 160) is greater than the threshold Th and sends a scanning report to its serving BS (e.g. BS 103). BS 103 negotiates with FBS 160 again to reduce its Tx power. FBS 160 determines that the negotiation to initiate IM is based on another consecutive request from SS 116 and decides to set the adjustable timer to time duration t+2a (i.e. initiation time duration increased by 2 increments) and begins counting down.

Meanwhile SS 116 moves away from FBS 160 at time 1740. In an embodiment, FBS 160 may continue to wait until the adjustable timer expires before reversing IM and raising its Tx power to its original level or another higher level. Although the adjustable timer of FIG. 17 has been described with respect to IM initiation, the same may also apply for IM adjustment (for increasing or decreasing Tx power).

In an embodiment, BS 103 may request FBS 160 to terminate IM when SS 116 no longer needs the resources after handing over to another serving BS, completing the session, going into idle state, and so forth. The event for triggering IM termination may be handover (HO) completion, network topology change, SS connection status change, deregistration, and such. When BS 103 detects such an event, BS 103 may notify FBS 160 before any time duration for monitoring FBS 160 expires. Similarly, FBS 160 may terminate IM measures that correspond to SS 116 and/or reset the IM timer before expiring.

Figure 18:
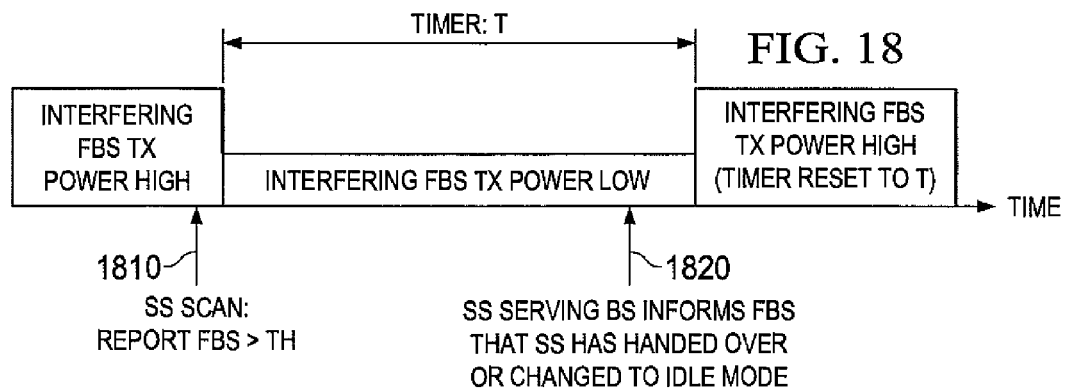
FIG. 18 illustrates a timeline for when a change in network topology or MS connection status may override an IM timer that has not yet expired.

FIG. 18 illustrates a timeline for when a change in network topology or MS connection status may override an IM timer that has not yet expired. FIG. 18 will be described using the same starting scenario and assumptions as FIG. 14. At time 1810, SS 116 determines that the signal strength of the interfering BS (e.g. FBS 160) is greater than a first threshold Th1 and sends a scanning report to its serving BS (e.g. BS 103). BS 103 negotiates with FBS 160 to reduce its Tx power. In addition, FBS 160 sets a timer to a time duration t and begins counting down. The timer may be a predefined timer or an adjustable timer.

Meanwhile SS 116 moves away from FBS 160 at time 1820. Or SS 116 may handover to another BS. Or SS 116 has finished sessions and entered to idle mode from connected mode. Consequently, BS 103 notifies FBS 160. In an embodiment, FBS 160 may reverse IM prior to the expiration of the adjustable timer and raise its Tx power to its original level or another higher level. Although the adjustable timer of FIG. 18 has been described with respect to IM initiation, the same may also apply for IM adjustment (for increasing or decreasing Tx power).

In some embodiments, BS 103 may be requested to intervene for IM by SS 116 that is experiencing interference from a FBS 160. For example, BS 103 may inform FBS 160 of the resource locations it is scheduling the traffic intended for SS 116. FBS 160 may agree to not carry any traffic on those resources, thereby automatically reducing interference.

In an embodiment, BS 103 may communicate with FBS 160 to determine the time instances in which FBS 160 will not have any scheduled traffic. Consequently, BS 103 may schedule traffic for SS 116 at those times when FBS 160 has no scheduled traffic.

In an embodiment, BS 103 may be requested to intervene from IM by a group of SSs experiencing interference from multiple interfering BSs. BS 103 may communicate with the interfering BSs to negotiate scheduling actions that would result in reduced interference at the SSs on the downlink. BS 103 and the group of interfering BSs may work with a controller that determines the best scheduling pattern for the intended traffic with the least interference. The controller may be an entity of the serving BS or a standalone entity in the backhaul network.

Although the present disclosure has described IM as being performed or terminated, the scope is not limited to the two statuses. IM may be performed, terminated, or adjusted at multiple adjustable levels. For example, Tx power, time durations, and the IM timer can be changed (i.e. increased or decreased) by different levels, changed incrementally, and/or set to different levels at each IM adjustment. In another example, resource reservation can be done by silencing blocks incrementally or by sets at each IM adjustment.

Trigger Conditions

As described in the embodiments of the present disclosure, the IM process is guided by robust trigger conditions. As described in previous embodiments, the trigger conditions may be encoded in type-length-value (TLV) format such that they may be easily included in messages. As mentioned in some previous embodiments in which a serving BS (e.g. BS 103) negotiates with an interfering BS (e.g. FBS 160) for IM on behalf of an SS (e.g. SS 116) that is connected to the serving BS, the serving BS may define trigger conditions for the following actions:

1. Trigger conditions for when an SS should initiate scanning procedure for IM initiation
2. Trigger conditions for when an SS should report scanning results of the interfering BS to the serving BS for IM initiation
3. Trigger conditions for when an SS should initiate scanning procedure for the interfering BS for IM termination
4. Trigger conditions for when an SS should report scanning results of the interfering BS to the serving BS for IM termination
5. Trigger conditions for IM initiation
6. Trigger conditions for IM termination
7. Trigger conditions that define when a non-member SS should initiate signaling directly to an interfering BS about a coverage hole caused by the interfering BS (e.g. by sending a ranging request)

The above example trigger conditions may be encoded in TLV format and included in messages sent to SSs. The serving BS may send the trigger conditions sequentially, e.g. according embodiments disclosed with reference to FIGS. 5 and 6 or according to some other procedure. In some embodiments, the serving BS may insert one or more trigger conditions in a single SCN-RSP message to the SS. In embodiments in which the SS autonomously scans inaccessible BSs, the serving BS may send some or all trigger conditions in a single SCN-RSP message to the SS. In some embodiments, some of the triggers may be omitted or may be defined but not transmitted. For example, if the serving BS controls the scanning and reporting, or the SS autonomously scans and reports interfering BSs, trigger conditions related to sending scanning requests may be omitted in serving BS, not sent to the SS, or ignored by SS when received. The trigger TLV for Type/Function/Action (Type xx.1) in Table 1 is encoded using the description in Table 2. The trigger TLV for other BS types (which includes BS type parameter: such as macro, macro hot-zone, femto, relay, and so forth) can also be encoded using the description in Table 2.

TABLE 1

Trigger TLV Description

| Name | Type | Length (Bytes) | Value |
|---|---|---|---|
| Type/Function/Action | xx.1 | 1 | See Table 2 - for description |
| Trigger Value | xx.2 | 1 | Trigger value is the value used in comparing measured metric for determining a trigger condition |

TABLE 1-continued

Trigger TLV Description

| Name | Type | Length (Bytes) | Value |
|---|---|---|---|
| Trigger averaging duration | xx.3 | 1 | Trigger averaging duration is the time measured in number of frames over which the metric measurements are averaged. |

TABLE 2

Trigger; Type/Function/Action Description

| Name | Length (Bits) | Value |
|---|---|---|
| Type | 2(MSB) | Trigger metric type:<br>0x0: CINR metric<br>0x1: RSSI metric<br>0x2: RTD metric<br>0x3: Number of missed superframes metric |
| Function | 3 | Computation defining trigger condition:<br>0x0: Reserved<br>0x1: Metric of neighbor inaccessible CSG femto ABS is greater than absolute value<br>0x2: Metric of neighbor inaccessible CSG femto ABS is less than absolute value<br>0x3: Metric of neighbor inaccessible CSG femto ABS is greater than serving ABS metric by relative value<br>0x4: Metric of neighbor inaccessible CSG femto ABS is less than serving ABS metric by relative value<br>0x5: Metric of serving ABS greater than absolute value<br>0x6: Metric of serving ABS less than absolute value<br>0x7: Reserved<br>NOTES<br>0x1-0x4 not applicable for RTD trigger metric<br>When type 0x1 is used together with function 0x3 or 0x4, the threshold value shall range from −32 dB (0x80) to +31.75 dB (0x7 F). When type 0x1 is used together with function 0x1, 0x2, 0x5 or 0x6, the threshold value shall be interpreted as an unsigned byte with units of 0.25 dB, such that 0x00 is interpreted as −103.75 dBm and 0xFF is interpreted as −40 dBm<br>Type 0x3 can only be used together with function 0x5 or function 0x6 |
| Action | 3 (LSB) | Action performed upon reaching trigger condition:<br>0x0: Reserved<br>0x1: Respond on trigger with AAI_SCN-REP to initiate IM<br>0x2: Respond on trigger with AAI_SCN-REQ to initiate IM (may be omitted)<br>0x3: Respond on trigger with AAI_RNG-REQ to indicate that non-member AMS is in a coverage hole generated by CSG femto ABS.<br>0x4: Respond on trigger with AAI_SCN-REP to terminate IM<br>0x5: Respond on trigger with AAI_SCN-REQ to terminate IM<br>0x6 and 0x7: Reserved<br>NOTES<br>0x4, 0x5 are only applicable after IM is initiated.<br>0x2, 0x5 are not applicable when neighbor ABS metrics are defined (i.e., only Function values 0x5 or 0x6 are applicable). |

As noted previously, IM is not limited with inaccessible BS. IM could be performed by any BS. Accordingly, this disclosure is not only limited to inaccessible BSs. Although an inaccessible BS (e.g. CSG-Closed FBS 160) was used to describe the embodiments, the disclosure can be extended to any BS, accessible or inaccessible, such as OSG FBS, CSG-Open FBS, picocell base station, hot-zone, and so forth. For example, in Table 2, inaccessible CSG femto may be any neighbor BS.

In an embodiment, a serving BS may define complex trigger conditions by including multiple Trigger TLV encodings in the same compound TLV. In those embodiments, all included triggers can have the same Action code (as defined in Table 2). The SS may perform a logical 'AND' of all the conditions in a complex trigger condition and invoke the action of the trigger only when all trigger conditions are met. Whenever the condition of a simple trigger or all the conditions of a complex trigger are met, the SS may invoke the action of the trigger. If multiple trigger conditions are met simultaneously, the SS may invoke the action of at least one of the triggers for which the trigger condition was met.

Scanning Reports

As discussed in previous embodiments, SS 116 sends scanning reports (e.g. SCN-REP) to either its serving BS (e.g. BS 103) or an interfering BS (e.g. BS 160) if SS 116 is not being served by any BS. Each scanning report includes information to identify at least one BS that was scanned and a respective signal strength value. In some embodiments, SS 116 may send scanning reports to a BS (e.g. BS 103 or FBS 160) regarding whether the reported base station is a CSG-Closed BS and, if so, whether the reported BS is one of the CSG-Close BSs to which SS 116 subscribes (i.e. whether SS 116 is a member of FBS 160), or whether the CSGID of the reported CSG-Closed BS is in the local whitelist of SS 116. As described previously, the local whitelist includes the identifications of the CSG BSs to which SS 116 is a member. When the BS 103 receives the message, BS 103 may consider the CSG-Closed BSs that are in the SS's whitelist as the handover candidates, while putting the CSG-closed femtos that not in the SS's whitelist as candidates to perform interference management schemes.

There may be multiple ways to convey such information from the SS to the BS. The information can be included in a message (i.e. scanning report) from the SS to the BS. The SS may indicate the number of the reported BSs (i.e. scanned BSs that are included in the SCN-REP) with full base station ID (BSID) reported. The SS may also indicate the number of reported CSG-Closed BSs with full base station ID reported, the number of reported CSG-Closed BSs whose CSGID(s) are in the SS's local whitelist (or the number of reported CSG-Closed BSs whose CSGID(s) are not in the SS's local whitelist). When the SS generates the SCN-REP with the reported BSs with full BSID, it can obey a certain rule to sort the reported BSs, such that the BS that receives the message may decode the message according to the rule. The rule can be, for example, when generating the SCN-REP for the reported BSs with full BSID reported, the SS will first report the CSG-Closed BSs whose CSGID(s) are in the whitelist of the SS, then report the CSG-Closed BSs whose CSGID(s) are not in the whitelist of the SS, then all the other reported BSs with full BSID reported.

When the BS receives the SCN-REP, it reads the fields that indicate the number of the reported BSs with full BSID reported, the number of reported CSG-Closed BSs with full BSID reported, the number of reported CSG-Closed BSs whose CSGID(s) are in the SS's local whitelist (or the number of reported CSG-Closed BSs whose CSGID(s) are not in the SS's local whitelist). Based on these numbers, the BS that receives the SCN-REP uses the same rule used by the SS to figure out which reported BSs are CSG-Closed BSs whose CSGID(s) are in the local whitelist of the SS, which reported BSs are CSG-Closed BSs whose CSGID(s) are not in the SS's whitelist, and which reported BSs are the BSs other than the CSG-Closed BSs.

Table 3 represents one example of the rule by which the SS can include such information for identifying the reported BSs and indicating the BS types for each reported BS in the scanning report message. The SS should include in the SCN-REP an indication of whether the reported CSG-Closed BS is in its whitelist to help the serving BS timely decide whether to perform handover or interference mitigation. A base stations (BSs) may also be referred as an Advance Base Station (ABS).

TABLE 3

| SCN-REP parameters | | | | |
|---|---|---|---|---|
| O/M | Name | Bits | Notes | Usage |
| . . . | | | | |
| O | N_Reported_ABS_Full | 6 | Number of neighbor ABS [0..63] reported in this message, which are using full 48-bit BSID. | Present only when the scanning report includes ABSs referred using ABS ID |
| O | Rsp_Bitmap_Index | Variable (Rsp_Bit map_Size) | Index of the corresponding AAI_SCN-RSP message, where the least significant bit corresponds to the first ABS Index, each next significant bit corresponds to the next ABS Index, the most significant bit corresponds to the ABS Index of the last reported ABS, and ABSs with ABS Index greater than the last reported ABS are not | Present if N_Reported_ABS_Full > 0 |

TABLE 3-continued

SCN-REP parameters

| O/M | Name | Bits | Notes | Usage |
|---|---|---|---|---|
| | | | reported and do not have a corresponding bit position in the bitmap. Bitmap position bit value: 0: the corresponding ABS is not reported. 1: the corresponding ABS is reported. | |
| | NumCSGClosed | Ceil (Log2 (N)) | # of CSG closed ABSs indicated in fullBsIdArr | Present if N_Reported_ ABS_Full > 0 |
| | NumCSGClosedWhitelist | Ceil (log2(N)) | # of CSG closed ABSs in AMSs whitelist, among the ABS IDs indicated in fullBsIdArr | Present if N_Reported_ ABS_Full > 0 |
| O | full BsId Arr [0..63] | Reported BSID | Variable (48 x N) | ABS-IDs of the ABSs reported in this message NumCSGClosedWhitelist IDs for CSG ABS in the AMSs whitelist appear first, followed by (NumCSGClosed - NumCSGClosedWhitelist) IDs of CSG ABSs not in AMSs whitelist, followed by other ABS IDs. | Present if N_Reported_ ABS_Full > 0 |
| O | N_Reported_SA_ Preamble_Index | 4 | Number of SA preambles reported in this message [0..15] | Present only when the scanning report includes SA preamble reports |
| ... | ... | | | |

In some embodiments, a different scheme may be used to convey the information regarding CSG-Closed BSs from the SS to the BS to which the BS is requesting IM (e.g. BS 103 when serving BS negotiates on behalf of SS 116 or FBS 160 when SS 116 is in idle mode and directly signals an interfering BS for IM). For example, the SS can indicate the number of the reported BSs with full BSID reported. The SS can then indicate the number M of reported CSG-Closed BSs with full BSID reported. The SS can then use an M-bit bitmap, in which each bit indicates whether the respective CSG-Closed BS is in the SS's local whitelist (e.g. '1' for being in the whitelist, '0' for not being in the whitelist). The BS the receives the message can then decode the fields of the message using the M-bit bitmap to determine out which BSs are CSG-Closed BSs whose CSGID(s) are in the whitelist of the SS, which CSG-Closed BSs have CSGID(s) that are not in the MS's whitelist, and BSs other than the CSG-Closed BSs.

Another way to convey such information from the SS to the BS, can be as follows. The SS can indicate the number of the reported BSs with full BSID reported. The SS can then indicate the number M of reported CSG-Closed BSs with full BSID reported. When the SS reports the CSG-Closed BSs with full BSID reported, it will first report the CSG-Closed BSs with an additional bit for each reported CSG-Closed BS that indicates whether the CSG-Closed BS is in the SS's local whitelist (e.g. '1' for the reported CSG-Closed BS whose CSGID(s) are in the SS's local whitelist, and '0' for the reported CSG-Closed BS whose CSGID(s) are not in the MS's local whitelist). The SS may then report all the other BSs with full BSID reported.

Note that, in the message, the SS may not need to include the number of reported CSG-Closed BSs with full BSID reported if the cell ID (i.e., secondary preamble, IDcell parameter, and such) is also associated with the reported BSID is reported, as the BS may have the partition information of cell IDs based upon which the BS can determine the type of the reported cell (e.g. CSG-Closed). Alternatively, the SS may not need to include the number of reported CSG-Closed BSs if the type of the cell is explicitly indicated in the reported BSID.

In some embodiments, different messages can be used to differentiate CSG-Closed BSs that are in the SS's whitelist. In an embodiment, the SS can send one type of message, e.g. handover request message, to the BS that includes/reports those detected CSG-Closed BSs whose CSG IDs are in the SS's whitelist, and another type of message, e.g. the scanning report, that includes/reports the detected CSG-Closed BSs whose CSGIDs are not in the SS's whitelist. Then the previous embodiment can apply to how to include the CSG-Closed BSs whose CSGIDs are not in the SS's whitelist.

An example is as follows. In a scanning report, the SS may indicate the number of all the reported BSs with full BSID reported. The SS can then indicate the number of reported CSG-Closed BSs with full BSID reported, and these BSs are meant to be the CSG-Closed FBSs that are not in the SS's whitelist, by the rule disclosed in this embodiment. Then when the SS reports the BSs with full BSID reported, it arranges the BSs based on BS type. For example, the SS may first report the CSG-Closed BSs whose CSGID(s) are not in the whitelist at the MS, then report the all the other BSs (e.g. accessible BSs) with full BSID reported.

It is again noted that, in the message, the SS may not need to include the number (i.e. count) of reported CSG-Closed BSs with full base station ID reported if the cell ID (i.e., secondary preamble or IDcell parameter) associated with the reported BSID is also reported, or if the type of the cell is explicitly indicated in the reported BSID.

In an embodiment, the SS and a BS can use the following procedure to determine whether the BS is in the SS's local whitelist. The SS may include the CSGIDs in its whitelist in a message to the BS, e.g., in a ranging request message (RNG-REQ). If the SS does not include any CSGID in RNG-REQ, then the process is as normal (i.e. no special treatment). However, if the SS includes partial CSGIDs in the RNG-REQ, then the BS may perform the following. If there is at least one CSGID included in the RNG-REQ that matches the BS's CSGID(s), accept the request. If none of the CSGIDs in the RNG-REQ matches the BS's CSGID(s), then the BS may reject the request and send its own CSGID(s). In some embodiments, re-direction information may or may not be mandated. The re-direction information is the information on the SS's accessible neighbor BSs, e.g., accessible neighbor BSs not in the broadcasted neighbor list.

The SS receives the CSGID(s) from the BS and checks whether it is in its local whitelist. If so, then the SS follows a normal access (i.e., send another RNG-REQ without including CSGIDs). If none of the CSGID(s) received from the BS is in the SS's local whitelist, the SS should not try to access any more.

In an embodiment, the SS may include all CSGIDs that are in its whitelist when sending the RNG-REQ to the BS. The SS would indicate in the RNG-REQ whether all the CSGIDs in its whitelist have been sent. If the BS determines that at one or more of the CSGID(s) included in the RNG-REQ matches the BS's CSGID(S), the BS will accept the request. If none of the CSGIDs matches the BS's CSGID(s), then the BS may reject the request and, in some embodiments, send the re-direction information.

As previously discussed, a serving BS (e.g. BS 103) may send a confirmation message, such as IM-INI, to an SS (e.g. SS 116) after IM is coordinated and performed with the interfering BS (e.g. FBS 160) on behalf of the SS.

TABLE 4

Parameters for message AAI_IM-INI

| Name | Value | Usage |
| --- | --- | --- |
| IM initiation indicator | 0: not initiated 1: initiated | Indicate whether IM is successfully initiated |
| CSG-Closed BSID | Full BS ID | BSID of the interfering ABS who coordinates and performs the IM |
| Preamble_Index | | Preamble index of the interfering ABS that coordinates and performs the IM |
| IM adjustment | 00: power control 01: resource reservation 10, 11: reserved | |

As shown in Table 4, the IM-INI message includes an IM initiation indicator that notifies the SS when IM has been initiated. In some embodiments, the initiation indicator may also be used to indicate when IM has been terminated and/or when an attempt to initiate IM was unsuccessful. IM-INI may also indicate the BSID and preamble index of the interfering BS at which IM measures are being conducted. In some embodiments, the IM-INI may also indicate the type of IM that is being performed at the interfering BS.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A Closed Subscriber Group (CSG) base station (BS) capable of performing interference mitigation (IM) in a wireless communications network, the CSG BS comprising:
    a wireless communication unit configured to communicate with subscriber stations (SSs); and
    a controller configured to:
        directly receive a ranging purpose indication in a ranging request message from a non-member SS through the wireless communication unit, and
        in response to the ranging request message, selectively perform the IM from among predetermined IM methods comprising (i) reducing transmission power locally and (ii) changing from a CSG-Closed status to a CSG-Open status if the CSG BS is in the CSG-Closed status.

2. The CSG BS of claim 1, wherein the ranging purpose indication indicates that the non-member SS is experiencing femto interference.

3. The CSG BS of claim 1, wherein the controller is further configured to determine whether conditions to initiate the IM are met and to perform the IM when the conditions to initiate the IM are met, the conditions to initiate the IM comprising at least one of:
    the ranging purpose indication indicates exceptional non-member access to the CSG BS;
    the non-member SS has been verified as a non-member of the CSG BS and a legal system user;
    the non-member SS has reported to the CSG BS all base stations the non-member SS can find and those base stations' respective signal strengths;
    the CSG BS is an interfering BS that causes the non-member SS to be unable to connect to any accessible BS; or
    the CSG BS has a highest signal strength among all interfering BSs.

4. The CSG BS of claim 1, wherein the controller is further configured to terminate the IM when conditions to terminate the IM are met, the conditions to terminate the IM comprising at least one of:
    a timer for the IM has expired;
    the non-member SS moves away from the CSG BS;
    the non-member SS hands over to another BS;
    the non-member SS has determined that a signal strength of an accessible BS is higher than a first threshold for at least a first threshold duration;
    the non-member SS has determined that a signal strength of the CSG BS is lower than a second threshold for at least a second threshold duration;
    the non-member SS has determined that the signal strength of the CSG BS is lower than the signal strength of the accessible BS by a third threshold for at least a third threshold duration; or
    the non-member SS has determined that the signal strength of the CSG BS is not a highest signal strength among scanned BSs for at least a fourth threshold duration.

5. A Closed Subscriber Group (CSG) base station (BS) capable of performing interference mitigation (IM) in a wireless communications network, the CSG BS comprising:
- a wireless communication unit configured to communicate with subscriber stations (SSs); and
- a controller configured to:
  - directly receive a ranging purpose indication in a ranging request message from a non-member SS through the wireless communication unit, and
  - in response to the ranging request message, change the CSG BS from a CSG-Closed status to a CSG-Open status if the CSG BS is in the CSG-Closed status,
- wherein the ranging purpose indication indicates that the non-member SS is experiencing femto interference, and
- wherein the CSG-Closed status of the CSG BS does not allow the non-member SS to access the CSG BS.

6. For use in a wireless communications network, a Closed Subscriber Group (CSG) base station (BS) capable of performing interference mitigation (IM), the CSG BS comprising:
- a wireless communication unit configured to communicate with subscriber stations (SSs); and
- a controller configured to:
  - receive a ranging request message from a non-member SS through the wireless communication unit, the ranging request message comprising a ranging purpose indication, and
  - in response to the ranging request message, perform an IM if conditions to initiate the IM are met, wherein the controller is further configured to receive at least one scanning report from the non-member SS to determine whether the conditions to initiate the IM are satisfied.

7. The CSG BS of claim 6, wherein the conditions to initiate the IM comprise at least one of:
- the ranging purpose indication indicates exceptional non-member access to the CSG BS;
- the non-member SS has been verified as a non-member of the CSG BS and a legal system user;
- the non-member SS has reported to the CSG BS all base stations the non-member SS can find and those base stations' respective signal strengths;
- the CSG BS is an interfering BS that causes the non-member SS to be unable to connect to any accessible BS; or
- the CSG BS has a highest signal strength among all interfering BSs.

8. The CSG BS of claim 6, wherein the controller is further configured to perform the IM by at least one of:
- if the CSG BS is in a CSG-Closed type, changing from the CSG-Closed type to a CSG-Open type such that the non-member SS is allowed to access the CSG BS, wherein the non-member SS is not allowed to access the CSG BS when the CSG BS is in the CSG-Closed type;
- allowing the non-member SS to temporarily access the CSG BS, wherein the non-member SS is served at a lower priority than member SSs while the CSG BS allows the temporary access;
- adjusting a downlink transmission power; or
- changing a frequency allocation.

9. The CSG BS of claim 6, wherein the ranging purpose indication indicates that at least one of:
- the non-member SS is requesting the CSG BS to perform the IM; or
- the non-member SS is experiencing a CSG BS interference.

10. The CSG BS of claim 6, wherein the controller is further configured to terminate the IM when conditions to terminate the IM are met.

11. The CSG BS of claim 10, wherein the conditions to terminate the IM comprise at least one of:
- a timer for the IM has expired;
- the non-member SS moves away from the CSG BS;
- the non-member SS hands over to another BS;
- the non-member SS has determined that a signal strength of an accessible BS is higher than a first threshold for at least a first threshold duration;
- the non-member SS has determined that a signal strength of the CSG BS is lower than a second threshold for at least a second threshold duration;
- the non-member SS has determined that the signal strength of the CSG BS is lower than the signal strength of the accessible BS by a third threshold for at least a third threshold duration; or
- the non-member SS has determined that the signal strength of the CSG BS is not a highest signal strength among scanned BSs for at least a fourth threshold duration.

12. The CSG BS of claim 11, wherein the conditions to terminate the IM comprise the timer for the IM expiring, and wherein the timer is adjustable according to at least one of:
- an IM type;
- a velocity of the non-member SS; or
- at least one scanning report received from the non-member SS.

13. The CSG BS of claim 6, wherein the controller is further configured to perform the IM by negotiating IM attributes with a network entity through at least one of: a backhaul or a self-organizing network server.

14. The CSG BS of claim 6, wherein the controller is further configured to receive a request to initiate a coordinated IM from a serving BS that is negotiating on behalf of the non-member SS when the non-member SS is connected to the serving BS.

15. For use in a wireless communications network, a method in a Closed Subscriber Group (CSG) base station (BS) for performing interference mitigation (IM), the method comprising:
- receiving a ranging request message from a non-member subscriber station (SS) through a wireless communication unit, the ranging request message comprising a ranging purpose indication;
- in response to the ranging request message, performing an IM if conditions to initiate the IM are met, and
- receiving at least one scanning report from the non-member SS to determine whether the conditions to initiate the IM are satisfied.

16. The method of claim 15, wherein the conditions to initiate the IM comprise at least one of:
- the ranging purpose indication indicates exceptional non-member access to the CSG BS;
- the non-member SS has been verified as a non-member of the CSG BS and a legal system user;
- the non-member SS has reported to the CSG BS all base stations the non-member SS can find and those base stations' respective signal strengths;
- the CSG BS is an interfering BS that causes the non-member SS to be unable to connect to any accessible BS; or
- the CSG BS has a highest signal strength among all interfering BSs.

17. The method of claim 15, further comprising performing the IM by at least one of:

allowing the non-member SS to temporarily access the CSG BS, wherein the non-member SS is served at a lower priority than member SSs while the CSG BS allows the temporary access;
adjusting a downlink transmission power; or
changing a frequency allocation.

18. The method of claim 15, wherein the ranging purpose indication indicates that at least one of:
the non-member SS is requesting the CSG BS to perform the IM; or
the non-member SS is experiencing a CSG BS interference.

19. The method of claim 15, further comprising terminating the IM when conditions to terminate the IM are met.

20. The method of claim 19, wherein the conditions to terminate the IM comprise at least one of:
a timer for the IM has expired;
the non-member SS moves away from the CSG BS;
the non-member SS hands over to another BS;
the non-member SS has determined that a signal strength of an accessible BS is higher than a first threshold for at least a first threshold duration;
the non-member SS has determined that a signal strength of the CSG BS is lower than a second threshold for at least a second threshold duration;
the non-member SS has determined that the signal strength of the CSG BS is lower than the signal strength of the accessible BS by a third threshold for at least a third threshold duration; or
the non-member SS has determined that the signal strength of the CSG BS is not a highest signal strength among scanned BSs for at least a fourth threshold duration.

21. The method of claim 20, wherein the conditions to terminate the IM comprise the timer for the IM expiring, and wherein the timer is adjustable according to at least one of:
an IM type;
a velocity of the non-member SS; or
at least one scanning report received from the non-member SS.

22. The method of claim 15, further comprising performing the IM by negotiating IM attributes with a network entity through at least one of: a backhaul or a self-organizing network server.

23. The method of claim 15, further comprising receiving a request to initiate a coordinated IM from a serving BS that is negotiating on behalf of the non-member SS when the non-member SS is connected to the serving BS.

24. For use in a wireless communications network, a serving base station (BS) capable of supporting interference mitigation (IM) when a subscriber station (SS) encounters interference, the serving BS comprising:
a wireless communication unit configured to communicate with the SS; and
a controller configured to:
request an interfering BS to perform IM when, based on a scanning report for IM initiation, the SS is unable to handover to any neighboring BS and conditions for the IM initiation are met, and
request the interfering BS to terminate the IM when, based on a scanning report for IM termination, conditions for the IM termination are met.

25. The serving BS of claim 24, wherein the controller is further configured to communicate with the interfering BS through a backhaul for at least one of:
requesting the interfering BS to perform the IM; or
requesting the interfering BS to terminate the IM.

26. A method in a serving base station (BS) for supporting interference mitigation (IM) when a subscriber station (SS) being served by the BS encounters interference, the method comprising:
requesting an interfering BS to perform IM when, based on a scanning report for IM initiation, the SS is unable to handover to any neighboring BS and conditions for the IM initiation are met; and
requesting the interfering BS to terminate the IM when, based on a scanning report for IM termination, conditions for the IM termination are met.

27. The method of claim 26, wherein at least one of requesting the interfering BS to perform the IM or requesting the interfering BS to terminate the IM is performed by communicating with a backhaul.

28. For use in a wireless communications network, a subscriber station capable of supporting interference mitigation (IM) when encountering interference, the subscriber station comprising:
a receiver configured to receive messages from base stations;
a transmitter configured to transmit messages to the base stations; and
a controller configured to:
if the subscriber station is connected to a serving BS, send a first scanning report to the serving BS to initiate IM with an interfering BS when handover to another BS is not possible and trigger conditions to send the first scanning report for IM initiation are met, and
if the subscriber station is not connected to any BS, send a ranging request message comprising a ranging purpose indication to the interfering BS to initiate the IM when handover to the interfering BS is not possible and trigger conditions to signal the interfering BS for the IM initiation are met.

29. The subscriber station of claim 28, further comprising a memory configured to store a local whitelist that identifies closed subscriber groups (CSGs) to which the subscriber station is a member,
wherein the controller is further configured to indicate in the first scanning report whether the interfering BS is a CSG BS that belongs to at least one of the CSGs in the local whitelist.

30. The subscriber station of claim 28, wherein the controller is further configured to:
if the subscriber station is connected to the serving BS, send a second scanning report to the serving BS to terminate the IM with the interfering BS when trigger conditions to send the second scanning report for IM termination are met.

31. A method in a subscriber station for supporting interference mitigation (IM) when encountering interference in a wireless communication network, the method comprising:
if the subscriber station is connected to a serving BS, sending a first scanning report to the serving BS to initiate IM with an interfering BS when handover to another BS is not possible and trigger conditions to send the first scanning report for IM initiation are met; and
if the subscriber station is not connected to any BS, sending a ranging request message comprising a ranging purpose indication to the interfering BS to initiate the IM when handover to the interfering BS is not possible and trigger conditions to signal the interfering BS for the IM initiation are met.

32. The method of claim 31, further comprising:
storing a local whitelist that identifies closed subscriber groups (CSGs) to which the subscriber station is a member; and
indicating in the first scanning report whether the interfering BS is a CSG BS that belongs to at least one of the CSGs in the local whitelist.

33. The method of claim 31, further comprising:
if the subscriber station is connected to the serving BS, sending a second scanning report to the serving BS to terminate the IM with the interfering BS when trigger conditions to send the second scanning report for IM termination are met.

34. The CGS BS of claim 1, wherein the controller is further configured to receive at least one scanning report from the non-member SS to determine whether conditions to initiate the IM are satisfied.

* * * * *